United States Patent
Uemura et al.

(10) Patent No.: US 6,648,954 B2
(45) Date of Patent: Nov. 18, 2003

(54) WATER-BASED PIGMENT DISPERSION, USE THEREOF AND PROCESS FOR THE PRODUCTION THEREOF

(75) Inventors: Toshiyuki Uemura, Tokyo (JP); Jun Kaneda, Tokyo (JP); Eriko Suzuki, Tokyo (JP); Takashi Negishi, Tokyo (JP); Seiji Aida, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 228 days.

(21) Appl. No.: 09/797,827

(22) Filed: Mar. 5, 2001

(65) Prior Publication Data

US 2001/0029870 A1 Oct. 18, 2001

(30) Foreign Application Priority Data

| | | |
|---|---|---|
| Mar. 6, 2000 | (JP) | 2000-059754 |
| Mar. 21, 2000 | (JP) | 2000-077499 |
| Aug. 9, 2000 | (JP) | 2000-241015 |
| Aug. 9, 2000 | (JP) | 2000-241016 |
| Dec. 11, 2000 | (JP) | 2000-375362 |
| Dec. 11, 2000 | (JP) | 2000-375363 |
| Jan. 22, 2001 | (JP) | 2001-012581 |

(51) Int. Cl.$^7$ ............... C09D 11/00; C08K 5/00
(52) U.S. Cl. ............. 106/31.85; 106/493; 106/31.65; 106/31.87
(58) Field of Search ............... 106/31.85, 493, 106/31.65, 31.87

(56) References Cited

U.S. PATENT DOCUMENTS

| | | | |
|---|---|---|---|
| 3,386,843 A | | 6/1968 | Jaffe et al. |
| 5,271,759 A | | 12/1993 | Wooden et al. |
| 5,380,870 A | | 1/1995 | Hari et al. |
| 5,472,494 A | | 12/1995 | Hetzenegger et al. |
| 5,882,390 A | | 3/1999 | Nagai et al. |
| 6,019,828 A | * | 2/2000 | Rehman ............ 106/31.58 |
| 6,027,210 A | * | 2/2000 | Kurabayashi et al. ....... 347/100 |
| 6,083,315 A | * | 7/2000 | Nakamura et al. .......... 106/410 |
| 6,153,001 A | * | 11/2000 | Suzuki et al. ............. 106/31.65 |
| 6,261,353 B1 | * | 7/2001 | Doi et al. ................. 106/31.6 |
| 6,280,513 B1 | * | 8/2001 | Osumi et al. ............. 106/31.6 |
| 6,332,919 B2 | * | 12/2001 | Osumi et al. ............. 106/31.6 |
| 6,378,999 B1 | * | 4/2002 | Doi et al. ................. 347/100 |
| 6,440,203 B2 | * | 8/2002 | Kato ........................ 106/31.6 |
| 6,454,846 B2 | * | 9/2002 | Yatake .................... 106/31.58 |

FOREIGN PATENT DOCUMENTS

| | | |
|---|---|---|
| EP | 0 787 775 | 8/1997 |
| EP | 0 834 537 | 4/1998 |
| EP | 0 851 005 | 7/1998 |
| JP | 50-4019 | 2/1975 |
| JP | 3-210375 | 9/1991 |

\* cited by examiner

*Primary Examiner*—Mark L. Bell
*Assistant Examiner*—Veronica F. Faison
(74) *Attorney, Agent, or Firm*—Wenderoth, Lind & Ponack, L.L.P.

(57) ABSTRACT

A water-based pigment dispersion comprising 100 parts by weight of a pigment, 3 to 30 parts by weight of a sulfonic acid group-containing pigment derivative and water, wherein the sulfonic acid group-containing pigment derivative has only one sulfonic acid group in a molecule of a pigment of which the type is the same as the type of the pigment to be dispersed, the sulfonic acid group forms at least one salt selected from the group consisting of ammonia salt, an organic amine salt and a salt in which at least 15% of the sulfonic acid group is liberated and the rest is a salt with monovalent metal, the content of metal ion having a valence of at least 2 in a solid matter of the above water-based pigment dispersion is 500 ppm or less, and the above pigment is dispersed in water according to electrostatic repulsion due to the sulfonic acid group-containing pigment derivative adsorbed on the particle surface of the pigment, an inkjet recording liquid containing the same and process for the production thereof.

21 Claims, No Drawings

WATER-BASED PIGMENT DISPERSION, USE THEREOF AND PROCESS FOR THE PRODUCTION THEREOF

FIELD OF THE INVENTION

The present invention relates to a water-based pigment dispersion excellent in dispersibility in water and dispersion stability with the passage of time, a process for the production thereof, and an inkjet recording liquid excellent in light resistance, water resistance and hue after printing and excellent in ejection stability in a nozzle.

PRIOR ART OF THE INVENTION

In a water-based ink or a water-based coating composition, conventionally, a pigment is dispersed in water by the use of a surfactant or a dispersing resin. However, the surfactant has a problem of the occurrence of foams. When an anti-foaming agent is used in combination for preventing the occurrence of foams, a problem of a decrease in leveling properties occurs. Further, the dispersing resin is effective for a pigment dispersion having a relatively high viscosity, but the dispersing resin exerts only a limited effect on a pigment dispersion having a low viscosity.

There are known methods of dispersing a pigment in water by the use of a dye soluble in water or a pigment derivative. For example, JP-A-56-155261 and JP-A-56-155262 disclose a water-based pigment dispersion containing a pigment and a dye having the same color tone as the color tone of the above pigment. According to the above method, part of the dye is adsorbed on the surface of the pigment, whereby the dispersion stability of the pigment in water is improved. However, when a coating composition or an ink is prepared therefrom, a problem of a color mixture or bleeding occurs since solubility of the dye in water is too large as compared with the affinity of the particle surfaces of the pigment.

JP-A-10-36741 discloses a water-based pigment dispersion containing a phthalocyanine pigment and a phthalocyanine compound into which a carboxylic acid group is introduced. According to the above method, the problem of bleeding is improved. However, a problem is still present in the dispersion stability of a pigment.

JP-A-11-49974 discloses a water-based pigment dispersion comprising a pigment and a pigment derivative into which a sulfonic acid group bonding to an inorganic ion is introduced. According to the above method, the dispersion stability of the pigment is secured due to the electrostatic repulsion of divalent metal ion forming a salt with the sulfonic acid group of the pigment derivative integrated with the pigment. However, it is difficult in view of production technology to control the dispersion dispersibility by a trace quantity of the divalent metal ion which is immixed in a pigment-dispersing step.

Concerning an inkjet recording liquid, the diameter of a printer nozzle decreases with an increase in the resolution of a printer. It is therefore required to decrease the diameter of pigment particles so as to form fine particles. However, when an inkjet recording liquid contains a pigment, it is difficult to satisfy requirements for an inkjet recording liquid such as ejection properties in a nozzle, re-solubility (dispersibility) and color development after printing, at the same time.

SUMMARY OF THE INVENTION

It is an object of the present invention to provide a water-based pigment dispersion excellent in dispersibility in water and stability in storage with the passage of time and a process for the production thereof.

It is another object of the present invention to provide a pigment type inkjet recording liquid which is excellent in ejection stability in a nozzle when used as an inkjet recording liquid and has a sufficient color reproduction range when used for printing and which has compatible properties of excellent water resistance and excellent light resistance.

According to the present invention, there is provided a water-based pigment dispersion comprising 100 parts by weight of a pigment, 3 to 30 parts by weight of a sulfonic acid group-containing pigment derivative and water, wherein the sulfonic acid group-containing pigment derivative has only one sulfonic acid group in a molecule of a pigment of which the type is the same as the type of the pigment to be dispersed, the sulfonic acid group forms at least one salt selected from the group consisting of ammonia salt, an organic amine salt and a salt in which at least 15% of the sulfonic acid group is liberated and the rest is a salt with monovalent metal, the content of metal ion having a valence of at least 2 in a solid matter of the above water-based pigment dispersion is 500 ppm or less, and the above pigment is dispersed in water according to electrostatic repulsion due to the sulfonic acid group-containing pigment derivative adsorbed on the particle surface of the pigment.

According to the present invention, there is further provided a water-based pigment dispersion according to the above invention, wherein the sulfonic acid group-containing pigment derivative includes a pigment derivative having only one sulfonic acid group in a molecule in an amount of at least 60% by weight based on the pigment to which a sulfonic acid group is to be introduced and a pigment derivative having at least two sulfonic acid groups in a molecule in an amount of 20% by weight or less.

According to the present invention, there is further provided an inkjet recording liquid containing the above water-based pigment dispersion.

According to the present invention, there is further provided a process for the production of a water-based pigment dispersion, comprising a step of introducing at least one sullonic acid group into a molecule by sufonating a pigment, a step of obtaining a sulfonic acid group-containing pigment derivative having only one sulfonic acid group by removing a pigment derivative having at least two sulfonic acid groups from a reaction product, and a step of dispersing the sulfonic acid group-containing pigment derivative obtained in the above step and a pigment having the same type pigment molecule structure as the structure of the above sulfonic acid group-containing pigment derivative in water.

DETAILED DESCRIPTION OF THE INVENTION

The pigment used in the present invention is selected from fused polycyclic pigments such as phthalocyanine pigments, quinacridone pigments, quinacridoneauinone pigments, isoindolinone pigments, quinophthalone pigments, diketopyrrolopyrrole pigments, perylene pigments, perinone pigments, indigo pigments, thioindigo pigments, dioxadine pigments, anthraquinone pigments, pyranthrone pigments, anthanthrone pigments, flavanthrone pigments, indanthrone pigments and metal complex pigments, and organic pigments such as benzimidazolone pigments, insoluble azo pigments, fused azo pigments and soluble azo pigments.

The pigment of the present invention includes a compound having a substitute in an unselective substitutable position of a pigment molecule skeleton which forms any one of the above pigments. The above substitute includes lower alkyl groups such as methyl and ethyl, lower alkoxy groups such as methoxy and ethoxy, halogen elements such as chlorine and bromine, a halogen-substituted alkyl group, a carboxylate group, an acetyl group and a hydroxyl group.

Specific examples of the pigment used in the present invention will be shown hereinafter according to C.I. pigment numbers.

The phthalocyanine pigments include C.I. pigment blue 15, 15:2, 15:3, 15:4, 15:5, 15:6 and 16 and C.I. pigment green 7 and 36.

The quinacridone pigments include C.I. pigment violet 19 and 42, C.I. pigment red 122, 192, 202, 206, 207 and 209, and C.I. pigment orange 48 and 49.

The isoindolinone pigments include C.I. pigment yellow 109, 110 and 173 and C.I. pigment orange 61.

Isoindoline pigments include C.I. pigment 139 and 185, C.I. pigment orange 66 and 69, C.I. pigment red 260 and C.I. pigment brown 38.

The quinophthalone pigments include C.I. pigmentyellow 138.

The diketopyrrolopyrrole pigments include C.I. pigment red 254, 255, 264 and 272 and C.I. pigment 71 and 73.

The benzimidazolone pigments include C.I. pigment yellow 120, 151, 154, 156, 175, 180, 181 and 194, C.I. pigment orange 36, 60, 62 and 72, C.I. pigment red 171, 175, 176, 185 and 208, C.I. pigment violet 32 and C.I. pigment brown 25.

The insoluble azo pigments include C.I. pigment red 1, 2, 3, 4, 5, 6, 7, 8, 9, 10, 11, 12, 13, 14, 15, 16, 17, 18, 20, 21, 22, 23, 31, 32, 37, 38, 41, 95, 111, 112, 114, 119, 136, 146, 147, 148, 150, 164, 170, 184, 187, 188, 210, 212, 213, 222, 223, 238, 245, 253, 256, 258, 261, 266, 267, 268 and 269, C.I. pigment orange 1, 2, 5, 6, 13, 15, 16, 22, 24, 34, 38 and 44, C.I. pigment violet 13, 25, 44 and 50, C.I. pigment brown 1, C.I. pigment yellow 1, 2, 3, 5, 6, 10, 12, 13, 14, 17, 49, 55, 60, 63, 65, 73, 74, 75, 81, 83, 87, 90, 97, 98, 106, 111, 113, 114, 116, 121, 124, 126, 127, 130, 136, 152, 165, 167, 170, 171, 172, 174, 176 and 188 and C.I. pigment blue 25.

The fused azo pigments include C.I. pigment yellow 93, 94, 95, 128 and 166, C.I. pigment orange 31, C.I. pigment red 144, 166, 214, 220, 221, 242, 248 and 262 and C.I. pigment brown 23, 41 and 42.

The perylene pigments include C.I. pigment red 123, 149, 178, 179, 190 and 224, C.I. pigment violet 29 and C.I. pigment black 31 and 32.

The perinone pigments include C.I. pigment orange 43, C.I. pigment red 194 and vat red 14.

The indigo pigments include C.I. pigment blue 63 and 73015:X.

The thioindigo pigments include C.I. pigment red 88 and 181.

The dioxadine pigments include C.I. pigment violet 23 and 37.

The anthraquinone pigments include C.I. pigment yellow 99, 108, 123, 147, 193 and 199 and C.I. pigment red 83, 89, and 177.

The pyranthrone pigments include C.I. pigment red 216 and 226, C.I. pigment orange 40 and 51.

The anthanthrone pigments include C.I. pigment red 168, C.I. pigment violet and vat orange 3.

The flavanthrone pigments include C.I. pigment yellow 24 and vat yellow 1.

The indanthrone pigments include C.I. pigment blue 60 and 64 and vat blue 4.

The metal complex pigments include C.I. pigment green 10, C.I. pigment yellow 117, 129, 150, 153, 177, 179, 257 and 271, and C.I. pigment orange 59, 65 and 68.

The diketopyrrolopyrrole pigments include C.I. pigment red 254, 255, 264 and 272, and C.I. pigment orange 71 and 73.

In the water-based pigment dispersion of the present invention, the pigment particles have preferably an average primary particle diameter of 1,000 to 5 nm, more preferably 150 to 5 nm. For preparing a pigment having such a particle diameter, a crude pigment or a pigment having a pigment quality level is wet-milled or dry-milled by salt milling or solvent milling, whereby the pigment is finely milled.

The term "salt milling" refers to the treatment of adding a small quantity of a water-soluble solvent to a mixture containing an organic pigment and a water-soluble inorganic salt, strongly kneading the resultant mixture with a kneading machine such as a kneader while controlling a temperature between 30° C. and 65° C. by water-cooling or the like and then pouring the kneaded mixture into water, to dissolve and remove the water-soluble inorganic salt and the water-soluble solvent.

The water-soluble inorganic salt is added as a milling assistant for the organic pigment. The amount of the water-soluble inorganic salt is 2 to 20 times, preferably 3 to 10 times, as large as the weight of the organic pigment. The water-soluble inorganic salt includes sodium chloride, potassium chloride and sodium sulfate. The water-soluble solvent is added for preventing caking or crystallization. The amount of the water-soluble solvent in the mixture is 0.5 to 5 times, preferably 0.5 to 3 times, as large as the weight of the organic pigment. The water-soluble solvent includes, for example, diethylene glycol, dipropylene glycol and monoalkyl ethers of these.

In the present invention, the treatment of finely milling a pigment can be carried out in the presence of a sulfonic acid group-containing pigment derivative.

Concerning the dispersed particle diameter of the pigment in the water-based pigment dispersion, the average particle diameter of the dispersed pigment particles is 10 to 150 nm, measured according to a laser scattering particle size distribution measuring device, the content of coarse particles having a diameter of 250 nm or larger is 1% by weight or less based on all the particles, and further, the dispersed particle diameter is 50 nm<D50<150 nm and 150 nm<D99<400 nm, preferably 150 nm<D99<250 nm. When the average dispersed particle diameter is too large, ejection stability is impaired when used as an inkjet recording liquid, or a precipitate occurs. It is preferred that the amount of the coarse particles is the smallest.

In the water-based pigment dispersion of the present invention, the pigment and the sulfonic acid containing-pigment derivative preferably have the same chemical structure. This means not only that the pigment derivative is of the same type as the type of the pigment to be dispersed but also that it is advantageous to select a pigment and a pigment derivative which have the same structure with regard to a basic skeleton among pigment derivatives and pigments which belong to the same type. For example, the benzimidazolone pigments have pigments which are different from each other in a basic skeleton, shown in the following (1) to (3). It is therefore preferred to select a sulfonic acid group-containing pigment derivative having the same basic skeleton as the skeleton of a pigment to be dispersed. When the basic molecule skeleton of a pigment to be dispersed and the basic molecule skeleton of Ha pigment derivative are the same, it is supposed that the adsorbability of the pigment derivative onto the particle surfaces of the pigment is increased so that dispersion stability is increased.

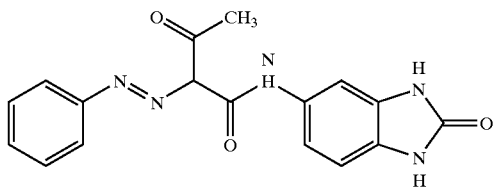

Formula [1]

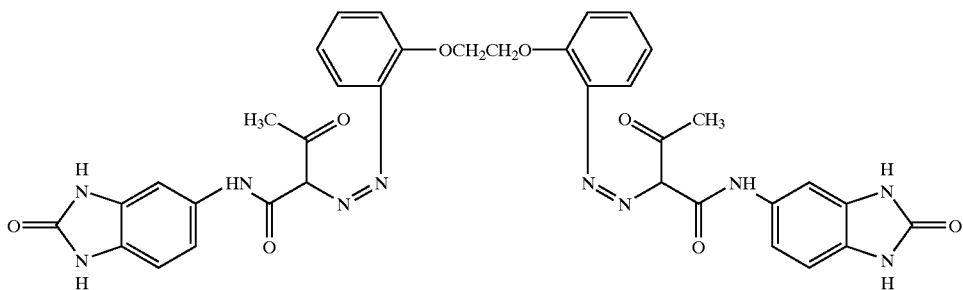

Formula [2]

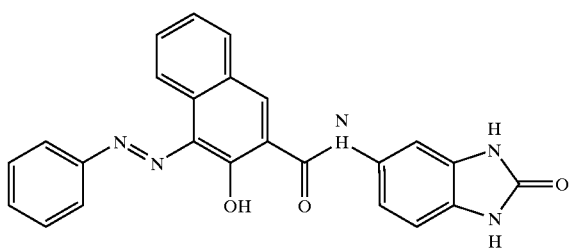

Formula [3]

The pigment derivative of the present invention has only one sulfonic acid group in a molecule. Pigment derivatives having at least two sulfonic acid groups in a molecule have large solubility in water so that adsorbability to particle surfaces of the pigment becomes small and there is no contribution to the dispersion stability of the pigment. In addition, it is required to remove the pigment derivatives having at least two sulfonic acid groups to a minimum since molecules dissolved in the water interfere the dispersion stability of the pigment.

Further, an inkjet recording liquid also has a problem of stability in storage with the passage of time. With regard to this problem, it is found that a compound having at least two sulfonic acid groups contained in the pigment derivative worsens the stability in storage.

For introducing a sulfonic acid group into a pigment, for example, it is sufficient to react a pigment with a sulfonating agent such as fuming sulfuric acid, concentrated sulfuric acid or chlorosulfuric acid. In the sulfonation, reaction conditions such as a reaction temperature and a reaction period of time are preferably controlled so as to maximize the rate of introducing only one sulfonic acid group into a pigment molecule. However, it is difficult to introduce only one sulfonic acid group into every pigment molecule in the sulfonation step. Generally, the compound having only one sulfonic acid group in a molecule is obtained as a mixture with a compound obtained by introducing at least two sulfonic acid groups into one molecule and an unreacted compound. It is therefore required to remove the pigment derivative having at least two sulfonic acid groups in a following step. For example, a pigment derivative containing a sulfonic acid group (including a compound containing at least two sulfonic acid groups) is used to dispersion-treat a pigment, to obtain a water-based pigment dispersion, and then, a pigment derivative containing at least two sulfonic acid groups which pigment derivative is dissolved in water may be removed by an ultrafiltration method or the like. Otherwise, a dispersion containing a sulfonic acid group-containing pigment derivative alone is prepared before dispersing a pigment and a pigment derivative containing al least two sulfonic acid groups may be removed from the dispersion.

In the ultrafiltration, generally, a dispersion liquid to be used for a purification can be heated to some extent so as not to exceed temperature durability of an ultrafiltration membrane. Further, the purification is efficiently performed by applying a higher temperature in a range of 5° C. to 80° C., preferably 10° C. to 60° C.

The amount of the pigment derivative having at least two sulfonic acid groups is 20% by weight or less, preferably 15% or less, based on the pigment derivative having only one sulfonic acid group.

The sulfonic acid group-containing pigment derivative contains the derivative having only one sulfonic acid group in a molecule in an amount of at least 60% by weight, preferably at least 70% by weight, based on a pigment to which a sulfonic acid group is introduced, and the derivative having at least two sulfonic acid groups in a molecule in an amount of 20% by weight or less, preferably 15% by weight or less.

When the sulfonic acid group-containing pigment derivative of the present invention is a derivative of a pigment obtained by a coupling reaction such as azo pigments or benzimidazolone pigments, a base component or a coupler component having one sulfonic acid group is produced and then both are coupled, whereby the sulfonic acid group-containing pigment derivative of the present invention may be also obtained.

Typical examples of pigment derivatives used in the present invention will be shown as follows.

(a)

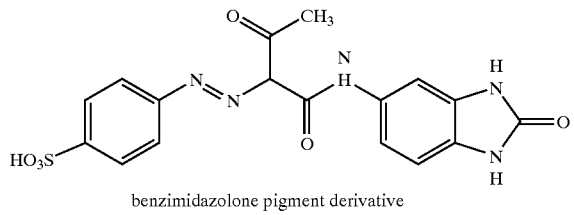
benzimidazolone pigment derivative (b)

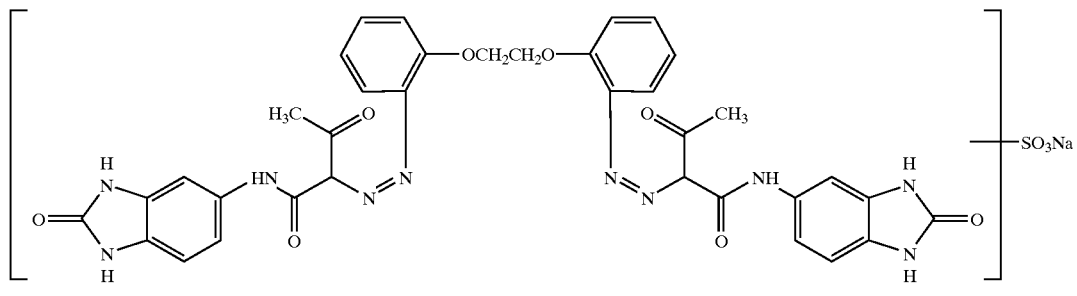
benzimidazolone pigment derivative (c)

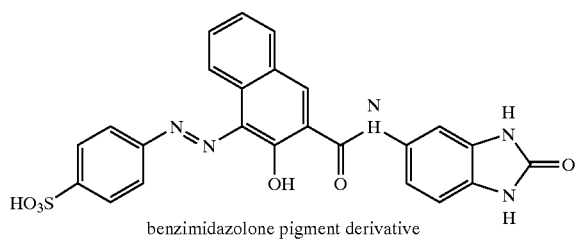
benzimidazolone pigment derivative (d)

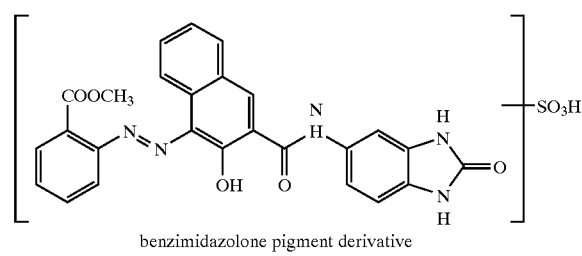
benzimidazolone pigment derivative (g)

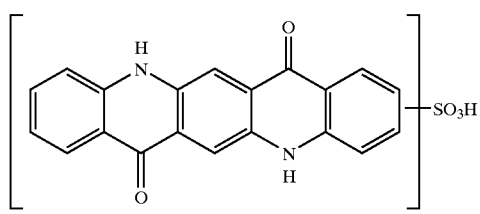
quinacridone pigment derivative (h)

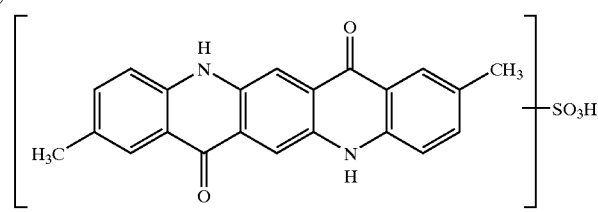
quinacridone pigment derivative (i)

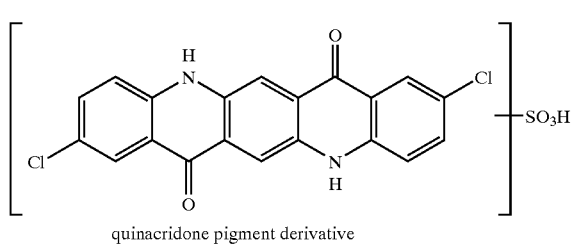
quinacridone pigment derivative

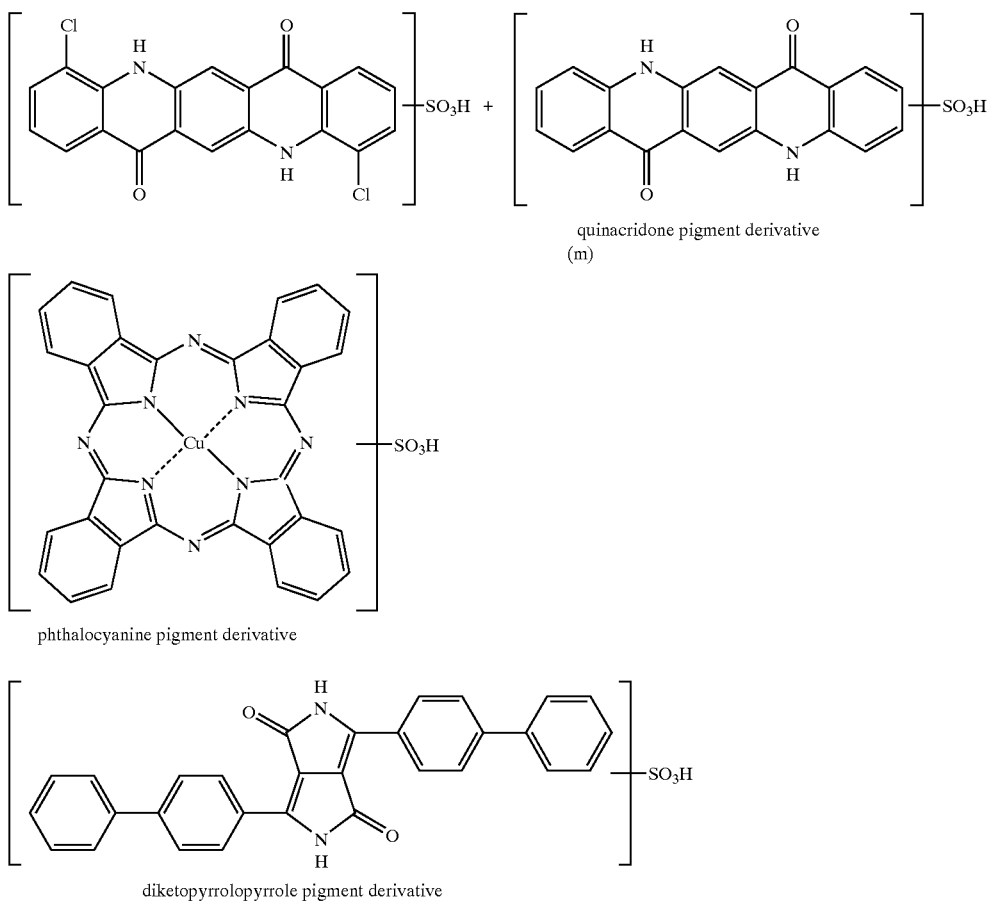

quinacridone pigment derivative (m)

phthalocyanine pigment derivative diketopyrrolopyrrole pigment derivative

In the water-based pigment dispersion, at least 15%, preferably at least 30%, based on all sulfonic acid groups, of the sulfonic acid group-containing pigment derivative of the present invention is present in a liberated state when a sulfonic acid group forms an alkaline metal salt. That is, all the sulfonic acid groups are present substantially in a liberated slate. Otherwise, 85%, preferably not more than 70%, based on all the sulfonic acid groups, of sulfonic acid groups form an alkaline metal salt such as Na or K. When a sulfonic acid group forms an ammonium salt or an organic amine salt every sulfonic acid group may form a salt.

The sulfonic acid group-containing pigment derivative of the present invention forms an ammonium salt, an organic amine salt or an alkaline metal salt in the water-based pigment dispersion. The sulfonic acid group-containing pigment derivative may form a salt with ammonia, an organic amine or an alkaline metal salt before dispersing a pigment. Otherwise, ammonia, an organic amine or an alkaline metal salt may be added to water during dispersing of a pigment.

The organic amine includes dimethylamine, trimethylamine, monoethylamine, diethylamine, triethylamine, propylamine, isopropylamine, dipropylamine, butylamine, isobutylamine, sec-butylamine, monoethanolamine, diethanolamine, triethanolamine, triisopropanolamine, isopropanolamine, dimethylethanolamine, diethylethanolamine, N-butyldiethanolamine, N,N-dimethyl-1,3-diaminopropane, and N,N-diethyl-1,3-diaminopropane.

In the present invention, the pigment to which the sulfonic acid group-containing pigment derivative adsorbs has a negatively-charged pigment surface. It is therefore supposed that the pigment is dispersed in water due to electrostatic repulsion thereof. For achieving a dispersion stability effect, monovalent metal having a high dissociation degree is particularly preferred as a counter ion of the sulfonic acid group. Further, in the water-based pigment dispersion of the present invention, the pigment derivative is also present in a dissolved or dispersed state in water as a medium other than the pigment derivative adsorbing to the pigment. The above non-adsorbing pigment derivative is assumed to contribute to the stability of the dispersion anywise. In the water-based pigment dispersion of the present invention, the pigment surface is improved in affinity with water by improving the surfaces of the pigment particles, and the water-based pigment dispersion of the present invention is a self-dispersible pigment dispersion which is stably dispersed in water without an additional dispersing assistant such as a dispersant, a surfactant or a water-soluble resin.

In the present invention, the amount of the sulfonic acid group-containing pigment derivative is preferably 3 to 30 parts by weight, more preferably 5 to 25 parts by weight, per 100 parts by weight of the pigment. The amount of the sulfonic acid group-containing pigment derivative per the pigment is smaller than the lower limit of the above range, undesirably, the dispersion stability of the pigment is insufficient. When the amount of the sulfonic acid group-containing pigment derivative exceeds the upper limit of the above range, undesirably, the viscosity of the dispersion is increased and dispersibility is decreased. Further, the pigment concentration in the water-based pigment dispersion of the present invention is preferably 10 to 30% by weight.

In the water-based pigment dispersion of the present invention, for maintaining the dispersion stability of a pigment in a fine state, it is preferred to remove metal ions having a valence of at least 2 such as Ca, Mg, Fe, Ba, Al and Ni, a chloride ion and a sulfuric acid ion to the utmost. These impurity ions can be removed by an ultrafiltration purification, a semipermeable membrane purification, an ion-exchange resin purification, a chelate purification or an acid washing of an aqueous dispersion liquid of a sulfonic acid group-containing pigment derivative or a pigment dispersion as an end product. Since these impurity ions are immixed during the step of synthesizing a pigment or pigment derivative or the step of producing a water-based dispersion, however, it is not avoidable to contain a certain amount of these impurity ions. According to the present invention, it is preferred to decrease the content of the metal ions having a valence of at least 2 in a solid matter of the water-based pigment dispersion to 500 ppm or less, and decrease the total amount of a chloride ion and a sulfuric acid ion in the solid matter of the water-based pigment dispersion to 100 ppm or less, more preferably 70 ppm or less. When the amount of the impurity ions is larger than the above numbers, it is not avoidable that the pigment is liable to be coagulated or precipitated.

The water-based pigment dispersion can be obtained by dispersing a pigment in water containing ammonia, an organic amine or monovalent metal ion in the presence of a sulfonic acid group-containing pigment derivative. In this case, when the water contains monovalent metal ion, the water preferably contains the monovalent metal ion in an amount smaller than the amount of all the sulfonic acid groups of the sulfonic acid group-containing pigment derivative.

The pH of water in which a pigment is to be dispersed is preferably adjusted to 7 to 11, more preferably 8 to 10, with ammonia, an organic amine or monovalent metal ion. As water to be used, purified water or pure water which does not contain metal ion having a valence of at least 2 or water pursuant to the above water is used.

A dispersing machine used in the dispersing step includes a paint conditioner (supplied by Red devil), a ball mill, a sand mill ("Dynomil", supplied by Sinmaru Enterprises), an attritor, a pearl mill ("DCP mill" supplied by EIRICH), a co-ball mill, a homo-mixer, a homogenizer (CLEARMIX, supplied by M Technique K,K), a wet jet mill ("Genus PY", supplied by Genus, "Nanomizer", supplied by Nanomizer). For a dispersing machine using media, glass beads, zirconia beads, alumina beads, magnetic beads or styrene beads may be used.

The sulfonic acid group-containing pigment derivative has a high dissociation degree. When the water-based pigment dispersion of the present invention has too strong alkalinity, therefore, the amount of a counter ion against a sulfonic acid group becomes excessive and the solubility or hydrophilicity of the pigment derivative in water therefore becomes high. Consequently, the adsorbability of the pigment derivative on a pigment surface is decreased so that the dispersion stability is decreased it is preferred to control the pH of the water-based pigment dispersion so as not to exceed 11.

In the present invention, the water-based pigment dispersion has a surface tension of at least 60 MN/m, preferably 60 to 75 mN/m. The above adjustment of a surface tension make it possible to prepare an inkjet recording liquid having a wide-ranging surface tension. Generally, when a water-based pigment dispersion contains a surfactant or a water-soluble dispersing resin, the surface tension of a water-based pigment dispersion is decreased. Therefore, a water-based pigment dispersion containing a surfactant or a water-soluble dispersing resin as a pigment dispersing agent has a low surface tension of 25 to 50 mN/m and an inkjet recording liquid obtained therefrom has a surface tension in a limited narrow range.

The water-based pigment dispersion of the present invention has a pH of 7 to 10, a conductivity of 600 $\mu$S/cm or less and a viscosity of 4.0 mPa·s or less, preferably 1.0 to 4.0 mPa·s.

The inkjet recording liquid contains preferably 0.5 to 10 parts by weight, more preferably 2 to 8 parts by weight, per 100 parts by weight of the inkjet recording liquid, of the water-based pigment dispersion of the present invention. When the amount of the pigment is too small, a sufficient viscosity as a recording liquid can not be obtained. When the amount of the pigment is too large, ejection stability and anti-clogging properties in a nozzle required as a recording liquid are impaired.

The inkjet recording liquid of the present invention may contain a water-based resin for increasing its fixing property to paper and improving a ink coating film in water resistance. The usable water-based resin can be broadly divided into a water-soluble resin and a water-dispersible resin. The water-based resin includes water-soluble or water-dispersible resins such as acrylic resins, styrene-acrylic resins, vinyl acetate-based resins, polyester-based resins, polyamide-based resins, polyurethane-based resins, epoxy resins, butadiene-based resins, petroleum-based resins and fluorine-containing resins The dispersed particle diameter of the water-dispersible resin can be changed by a polymerization operation or with a surfactant, and generally, the dispersed particle diameter thereof is several tens of nanometers to several thousands of nanometers. For preventing a clogging in a nozzle, preferably, the water-dispersible resin has an average particle diameter of 20 to 300 nm, measured with a laser scattering particle size distribution measuring device, and the content of coarse particles having a diameter of at least 500 nm is 3% by weight or less based on all the resin particles. More preferably, the water-dispersible resin has an average particle diameter of 50 to 200 nm, and the content of coarse particles having a diameter of at least 500 nm is 2% by weight or less based on all the resin particles.

The inkjet recording liquid may contain 0.05 to 5 parts by weight, preferably 0.1 to 3 parts by weight, per 100 parts by weight of the inkjet recording liquid, of the water-soluble resin or the water-dispersible resin.

The inkjet recording liquid of the present invention may contain anionic, cationic, nonionic and amphoteric surfactants and high-molecular surfactants for adjusting a surface tension or adjusting penetration in paper.

The anionic surfactant includes fatty acid salt, alkyl sulfate, alkylaryl sulfonate, alkylnaphthalene sulfonate, dialkyl sulfonate, dialkyl sulfosuccinate, alkyl diaryl ether disulfonate, alkyl phosphate, polyoxyethylene alkyl ether sulfate, polyoxyethylene alkylaryl ether sulfate, a naphthalenesulfonic acid formalin condensate, polyoxyethylene alkylphosphate, glycerol borate fatty acid ester, and polyoxyethylene glycerol fatty acid ester.

The nonionic surfactant includes polyoxyethylene alkyl ether, polyoxyethylene alkylaryl ether, a polyoxyethylene oxypropylene block copolymer, sorbitan fatty acid ester, polyoxyethylenesorbitan fatty acid ester, polyoxyethylenesolbitol fatty acid ester, glycerin fatty acid ester, polyoxyethylene fatty acid ester, polyoxyethylenealkylamine, and fluorine-containing and silicon-containing nonionic surfactants.

The cationic surfactant includes alkylamine salt, quaternary ammonium salt, alkylpyridinium salt and alkylimidazolium salt.

The amphoteric surfactant includes alkylbetaine, alkylamine oxide and phosphatidyl choline.

The high-molecular surfactant include an acrylic water-soluble resin, a styrene-acrylic water-soluble resin, a water-soluble polyester-based resin and a water-soluble polyamide-based resin.

As a surfactant, the anionic surfactant, the cationic surfactant, the nonionic surfactant and the high-molecular surfactant may be used in combination as required.

The water-based pigment dispersion and the inkjet recording liquid of the present invention are composed of a pigment, a pigment derivative, optionally a water-based resin and optionally other additives in a water-based medium.

The water-based medium includes water, an organic solvent mixable with water, and mixtures of these. The water includes deionized water from which metal ions, etc., are removed and distilled water. The water content in the water-based pigment dispersion or the inkjet recording liquid is preferably 49 to 95% by weight.

In the present invention, the water-based solvent refers to an organic solvent which is able to be mixed with water. The water-based solvent works to stably eject the recording liquid and to prevent the drying in a nozzle with the passage of time by preventing the drying and solidification of the inkjet recording liquid in a nozzle portion. The water-based solvents are used alone or in combination. The content of the water-based solvent in the recording liquid is 1 to 50% by weight, preferably 2 to 25% by weight.

The water-based solvent includes ethylene glycol, diethylene glycol, propylene glycol, 1,3-propanediol, triethylene glycol, polyethylene glycol, glycerin, tetraethylene glycol, dipropylene glycol, ketone alcohol, diethylene glycol monobutyl ether, ethylene glycol monobutyl ether, triethylene glycol monobutyl ether, ethylene glycol monoethyl ether, 1,2-hexanediol, N-methyl-2-pyrrolidone, 2,4,6-hexanetriol, tetraflufuryl alcohol and 4-methoxy-4-methylpentanone.

For increasing the drying rate of the recording liquid, an alcohol such as methanol, ethanol or isopropyl alcohol may be used.

The inkjet recording liquid of the present invention may contain a variety of additives to be described hereinafter, as required.

When a receptor sheet for the recording liquid has an osmotic property like paper, a penetrant may be used for promoting the penetration of the recording liquid and promoting the apparent drying properties.

The penetrant includes glycol ethers such as diethylene glycol monobutyl ether, described as a water-based solvent, alkylene glycol, polyethylene glycol monolauryl ether, sodium laurylsulfate, sodium dodecylbenzenesulfonate, sodium oleate and sodium dioctylsulfosuccinate. The amount of the penetrant is 0 to 5% by weight, preferably 0.1 to 5% by weight, based on the recording liquid. The penetrant exhibits a sufficient effect when used in an amount in the above range. When the amount of the penetrant is greater than the above, undesirably, the penetrant causes a feathering of prints and print-through.

An antifungal agent is added for preventing the occurrence of mold or bacteria in the recording liquid. The antifungal agent includes sodium dehydroacetate, sodium benzoate, sodium pyridinethione-1-oxide, zinc pyridinethione-1-oxide, 1,2-benzisothiazolin-3-one and an amine salt of 1-benzisothiazolin-3-one. The antifungal agent is preferably used in an amount of approximately 0.05 to 1.0% by weight based on the recording liquid.

The chelating agent works to block metal ion in the recording liquid and is added for preventing the deposition of a metal on a nozzle portion and the precipitation of insolubles in the recording liquid. The chelating agent includes ethylenediaminatetracetic acid, sodium salt of ethylenediaminetetraacetic acid, diammonium salt of ethylenediaminetetraacetic acid, and tetraammonium salt of ethylenediaminetetraacetic acid. The amount of the chelating agent based on the recording liquid is 0.005 to 0.5% by weight.

Further, for adjusting the pH of the recording liquid to secure the stability of the recording liquid or the stability of a recording liquid tubing of a recording apparatus, the recording liquid may contain a pH adjuster such as an amine, an inorganic salt or ammonia and a buffer solution such as phosphoric acid.

Further, for preventing the occurrence of foams at the time of ejection of the recording liquid, circulation or movement inside an tubing and production of the recording liquid, an antifoaming agent may be added to the recording liquid.

The inkjet recording liquid of the present invention can be produced by dispersing a pigment dispersion and a water-based resin in a water-based medium, properly diluting the mixture with water, and adding and mixing other additives.

The dispersing can be carried out with a disper, a sand mill, a homogenizer, a ball mill, a paint shaker or an ultrasonic dispersing machine. Further, the mixing and stirring can be carried out with a general stirrer having blade(s) or other machine such as a high-speed dispersing machine or an emulsifying machine.

The mixed recording liquid is preferably fully filtrated with a filter having an opening diameter of 0.65 $\mu$m or less, more preferably 0.45 $\mu$m or less before or after diluting. The recording liquid can be filtrated by centrifugal separation before the above filtering with a filter, whereby the clogging due to the filtration with a filter is decreased so that the number of filter changes can be decreased.

Although differing depending upon the method of a recording apparatus, the recording liquid is preferably prepared as a liquid having a viscosity of 0.8 to 15 cps (25° C.). The recording liquid preferably has a surface tension of 25 to 73 dyn/cm. Although not specially limited, the recording liquid is preferably alkalescent in the pH range of 7 to 10.

When the water-based pigment dispersion of the present invention is used for an inkjet recording liquid, the inkjet recording liquid shows excellent water resistance and stability in storage, is free from the clogging in a nozzle, and performs a stable ejection for a long period of time. Further, when the inkjet recording liquid is used for making printing on paper, the printing has a sufficient concentration in quality, has a broad color reproduction range and is excellent in light resistance as compared with a dye type inkjet recording liquid. Therefore, the inkjet recording liquid of the present invention can be used as a colored printed matter in the broad fields of document preparation in offices, address and name recordings of postal matters, marking and numbering on corrugated paper, barcode recordings, and the like.

Further, the water-based pigment dispersion of the present invention can be used in the fields of a gravure ink, a water-based coating composition and a printing ink.

EFFECT OF THE INVENTION

The water-based pigment dispersion of the present invention contains 3 to 30 parts by weight of, as a dispersing agent, a pigment derivative having only one sulfonic acid group which pigment derivative belongs to the same type as the type of a pigment to be dispersed, per 100 parts by weight of the pigment, and in the water-based pigment dispersion of the present invention, the sulfonic acid group is at least one salt selected from the group consisting of an ammonium salt, an organic salt and a salt in which at least 15% of the sulfonic acid group is liberated and the rest is a salt with a monovalent metal. Owing to the above structure, the pigment shows a high dispersibility. Further, since the content of metal ion having a valence of at least two is adjusted to 500 ppm or less in the water-based pigment dispersion, there is obtained a water-based pigment dispersion which has a low conductivity and a high surface tension in a high pigment concentration range and which is excellent in dispersion stability with the passage of time.

Further, the present invention can provide a water-based inkjet recording liquid which satisfies the following required properties, that is,

- a high-quality recorded image is obtained without a feathering,
- the drying rate and the fixing rate of the recording liquid are high,
- the recording liquid is stably ejected without clogging in a nozzle or a recording liquid distribution tubing,
- the stability in storage of the recording liquid is excellent,
- the concentration of a recording is high, and the light resistance and the water resistance of a printed product are excellent.

According to the present invention, further, there is provided a process for the production of a water-based pigment dispersion, comprising a step of introducing at least one sulfonic acid group into a molecule by sulfonating a pigment, a step of obtaining a sulfonic acid group-containing pigment derivative having only one sulfonic acid group by removing a pigment derivative having at least two sulfonic acid groups from a reaction product by an ultrafiltration method, and a step of dispersing a pigment having the same pigment molecule structure as the structure of the above sulfonic acid group-containing pigment derivative obtained in the above step in water in the presence of the sulfonic acid group-containing pigment derivative.

According to the production process of the present invention, there can be obtained a water-based pigment dispersion which has a low conductivity and a high surface tension in a high pigment concentration range and is excellent in dispersion stability with the passage of time.

EXAMPLES

The present invention will be explained more in detail with reference to Examples hereinafter, while the present invention shall not be limited to these Examples. In Examples, "part" stands for "part by weight".

Measurements or evaluations were carried out with regard to the content ratio of a compound having one sulfonic acid group (n=1) in a pigment derivative, the content of metal ion having a valence of at least 2, particle diameter, viscosity, surface tension, conductivity stability in storage, foamability and zeta potential. Further, inkjet recording liquids were measured or evaluated for particle diameter, viscosity, surface tension, stability in storage, ejection stability, water resistance and anti-clogging properties. Further, printing was made on plain paper sheets and a printed product was evaluated for quality. These measurements and evaluations were carried out as described below.

(1) Measurement of the Content Ratio of a Compound Having one Sulfonic Acid Group (n=1) in a Pigment Derivative A pigment derivative was dissolved in a polar solvent such as methanol, dimethylformamide or water, and the compound having one sulfonic acid group was separated with HPLC of opposite phase (column for HPLC: Crestpak C18S, supplied by Nippon Bunko) and measured.

(2) Measurement of the Content of Metal Ion Having a Valence of at least 2

Each of a pigment, a pigment derivative and a pigment dispersion was dried, each of the dried powders was acid-decomposed with nitric acid and an aqueous perchloric acid, an aqueous solution of the resultant decomposed substance was prepared and analyzed for the amount of calcium, the amount of magnesium, the amount of iron, the amount of barium and the amount of nickel by emission spectroscopic analysis, and the total amount of these was considered as the content of metal ion having a valence of at least 2.

(3) Measurement of a Chloride Ion Content and a Sulfuric Acid Ion Content

A pigment dispersion was diluted with purified water to a measurable range and measured for a chloride ion content and a sulfuric acid ion content with an ion chromatograph measuring device (2010i, supplied by DIONEX) and a column (IonPac AS4A, supplied by DIONEX).

(4) Average Particle Diameter of a Pigment

A pigment was dispersed in a solvent and applied to a cell surface, which was observed through a transmission electron microscope (TEM) to determine an average particle diameter.

(5) Dispersed Particle Diameter

Measurement was carried out with a particle size distribution measuring apparatus (Microtrack UPA, supplied by NIKKISO) according to a laser diffraction method, to measure D50 and D99.

(6) Viscosity

A viscosity at 25° C. was measured with a vibration viscometer ("VM-1A", supplied by Yamaichi Electronic Co., Ltd) in a low viscosity region and measured with a B type viscometer in a middle viscosity region or higher viscosity region.

(7) Surface Tension

Surface tension at 25° C. was measured with a tensionmeter ("CBVP-Z", supplied by KYOWA KAIMEN KAGAKU).

(8) Measurement of Conductivity

Conductivity at 25° C. was measured with a conductivity measuring device ("DS-12", supplied by HORIBA).

(9) Measurement of pH

A pH at 25° C. was measured with a pH ion meter ("IOL-50", supplied by DKK).

(10) Stability in Storage

With regard to a water-based dispersion, stability in storage is represented by the number of storage days when a particle diameter change at 50° C. was less than 15 nm and a viscosity change was less than 0.5 cps. When the stability in storage was not more than one day, the stability in storage is represented by X.

With regard to an inkjet recording liquid, after the inkjet recording liquid was stored at 50° C. for 3 months, the inkjet recording liquid was evaluated for a stability in storage from changes of a particle diameter and a viscosity. (○: a particle diameter change of less than 15 nm and a viscosity change of less than 0.2 cps, X: a particle diameter change of 15 nm or higher and a viscosity change of 0.2 cps or higher).

(11) Formability 30 ml of a water-based pigment dispersion was added to a screw tube equipped with a cap and having a volume of 50 ml, the screw tube was violently shaken up or down approximately twenty times, and after three minutes, formability was evaluated based on the state of foams. (◉: foams disappeared, ○: forms slightly existed on the inside surface of the screw tube, Δ: foams existed on the entire surface and the height of forms was less than 3 mm, X: foams existed on the entire surface and the height of forms was at least 3 mm).

(12) Zeta Potential

A pigment dispersion was diluted with purified water to a measurable range, the zeta potential of the pigment dispersion was measured with a zeta potential measuring device ("ZETA PALS", supplied by NIKKISO).

(13) Ejection Stability

An inkjet recording liquid was charged in a cartridge of an inkjet printer ("HG-5130", supplied by Epson Company). Printing was conducted on plain paper sheets ("K" supplied by Xerox), to evaluate ejection stability. (O: the ink was continuously ejected in a stable state from a nozzle for at least 120 minutes, Δ: irregularities were found in landing positions of a liquid drop within continuous ejection of 120 minutes, X: no stable ejection from a nozzle was found).

(14) Water Resistance

A printed product obtained in (13) was wetted with water and then rubbed with a finger, and the printed product was visually observed for a change. (O: no featherings and no peeling of the ink were found, X: featherings and peelings of the ink were found).

(15) Anti-Clogging Properties

Printing was carried out in the same manner as in (13), and then, the cap of the printer was removed. Printing was carried out again after 1 hour from the removal of the cap, and the presence or absence of clogging was evaluated. (O: no clogging of a nozzle, X: presence of clogging of a nozzle).

(16) Quality of Printed Product

An inkjet recording liquid was charged in a cartridge of an inkjet printer ("PM-750C", supplied by Epson Company). Printing was conducted on plain paper sheets ("4024" supplied by Xerox), to print characters in a 10 point MS MYOCHO font and to evaluate feathering properties of the ink. (O: almost free from feathering, the character of "龍" was discriminable without feathering, X: a feathering was found, it was difficult to discriminate the character of "龍" due to the feathering).

Example 1

Benzimidazolone Pigment (Preparation of a Pigment Dispersion (a'))

8.0 parts by weight of sodium hydroxide was dissolved in 200 part of deionized water, and 17.3 parts of 4-aminobenzensulfonic acid was added. 50 parts of concentrated hydrochloric acid was added to the resultant solution, and the mixture was cooled to 0° C. or less. Then, 7.2 parts of sodium nitrite was dissolved in 20 parts of deionized water, the mixture was dropwise added to a reaction system, and the resultant mixture was stirred for 1 hour at 5° C. or less. Then, 10.4 parts of sodium hydroxide was dissolved in 1,000 part of deionized water, and 23.3 parts of acetoacetyl-benzimidazole was added. 25.5 parts or 85% by weight acetic acid was added thereto. To the resultant solution was dropwise added the diazonium salt solution prepared above, and the mixture was stirred for 1 hour at room temperature. A precipitate was filtrated and washed with deionized water to obtain 210 parts of an aqueous paste of a pigment derivative (42 parts when dried).

Then, the aqueous paste of the pigment derivative was re-slurried with deionized water to prepare a 8% by weight aqueous dispersion. The above aqueous dispersion was desalted and washed by the use of a semipermeable membrane ("Spectra/Por", a fractional molecular weight 12,000–14,000, supplied by Spectrum Medical Industries), to decrease the content of metal ions having a valence of at least 2 from 850 ppm to 620 ppm and decrease the total amount of a chloride ion content and a sulfuric acid ion content from 50 ppm to 10 ppm.

Then, 10 parts of a dry product of the pigment derivative purified above was added to a solution obtained by dissolving 15 parts of triethanolamine in 200 part of deionized water, to adjust its pH to 9.0 and to obtain a precipitate. Then, the precipitate was filtrated and washed with deionized water and dried, to obtain a pigment derivative (a'). In the pigment derivative (a'), the n=1 (compound containing one sulfonic acid group) content ratio was 100%.

Pigment dispersion (a')

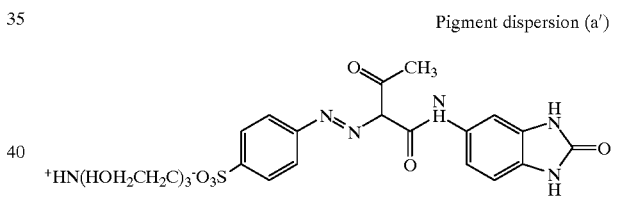

(Preparation of a Water-based Pigment Dispersion)

20 g of C.I. pigment orange 60 having an average primary particle diameter of 85 nm (in which the content as metal ions having a valence of at least 2 was 320 ppm), 1.6 g of the pigment derivative (a') and 110 g of deionized water were mixed, triethanolamine was added so as to adjust pH of a mixture liquid to 9.0, and the mixture liquid was dispersed with a paint shaker in the presence of zirconia beads as media for approximately 5 hours, to obtain a pigment dispersion. The obtained water-based pigment dispersion was diluted so as to have a concentration of 3% by weight, and the diluted water-based pigment dispersion was dropped to NO.2 filter paper, to show no bleedings of the pigment derivative.

Example 2

Benzimidazolone Pigment (Preparation of a Pigment Derivative (b'))

50 parts of C.I. pigment yellow 180 was added to 750 parts of 95% by weight sulfuric acid at 10° C. or lower. Then, the temperature was increased to 15° C., and the mixture was stirred for 2 hours at 15° C., and then the mixture was poured into ice water, to obtain a precipitate. The precipitate was filtered and washed with 5% by weight common salt water, to obtain 294 parts of an aqueous paste of a sulfonated pigment (53 parts when dried). In the sulfonated pigment, the n=1 (compound having one sulfonic acid group) content ratio was 90%, the n=2 (compound having two sulfonic acid groups) content ratio was 8%, and the rest was a non-substitution product.

Then, the aqueous paste of the pigment derivative was re-slurried with deionized water to prepare a 1% by weight aqueous dispersion. The above aqueous dispersion was desalted and washed with an ultrafilter ("Centramate", supplied by Nihon Pall Ltd.) having a membrane ("Centramate cassette", a fractional molecular weight 300,000, supplied by Nihon Pall Ltd.) to decrease the content of metal ions having a valence of at least 2 from 860 ppm to 810 ppm and decrease the total amount of a chloride ion content and a sulfuric acid ion content from 60,000 to 80 ppm.

Then, the above-purified pigment derivative was treated in the same manner as in Example 1, to generate a triethanolamine salt, whereby an aqueous dispersion having a pigment derivative (b') concentration of 3% by weight was obtained.

ions having a valence of at least 2 was 380 ppm), 4 g of the pigment derivative (c) and 110 g of deionized water were mixed, aqueous ammonia was added so as to adjust the pH of a mixture liquid to 9.0, and the mixture liquid was dispersed with a paint shaker in the presence of zirconia beads as media for approximately 5 hours, to obtain a water-based pigment dispersion.

Example 4

Benzimidazolone Pigment
(Preparation of a Pigment Derivative (d))

A sulfonated pigment was obtained in the same manner as in Example 2 except that C.I. pigment yellow 180 was replaced with C.I. pigment yellow 175. In the sulfonated pigment, the n=1 (compound having one sulfonic acid group) content ratio was 85%, the n=2 (compound having two sulfonic acid groups) content ratio was 12%, and the rest was a non-substitution product.

Thereafter, the same ultrafiltration treatment as that in Example 2 was carried out, to decrease the content of metal ions having a valence of at least 2 from 690 ppm to 540 ppm Pigment derivative (b')

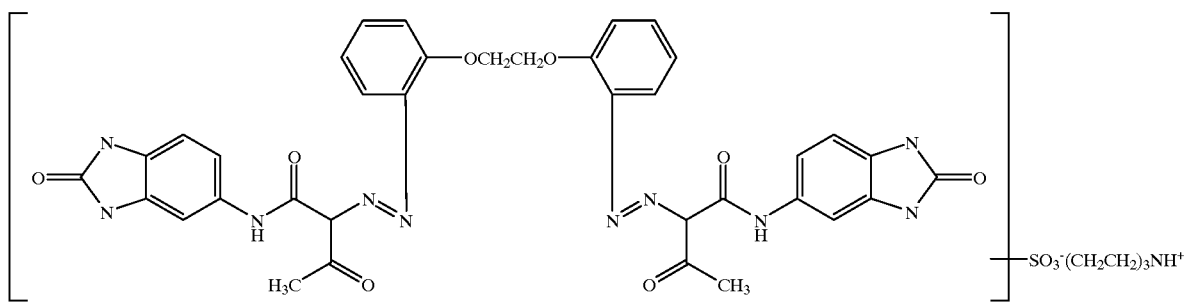

(Preparation of a Water-based Pigment Dispersion)

20 g of C.I. pigment yellow 180 having an average primary particle diameter of 80 nm (in which the content of metal ions having a valence of at least 2 was 400 ppm), 53 g of the above aqueous dispersion of the above pigment derivative (b') and 59 g of deionized water were mixed, triethanolamine was added so as to adjust the pH of a mixture liquid to 9.0, and the mixture liquid was dispersed with a paint shaker in the presence of zirconia beads as media for approximately 5 hours, to obtain a pigment dispersion.

Example 3

Benzimidazolone Pigment
(Preparation of a Pigment Derivative (c))

An aqueous paste of a pigment derivative (c) was obtained in the same manner as in Example 1 except that 23.3 parts of the acetoacetylbenzimidazole was replaced with equimolar amount (33.8 parts) of 3-hydroxy-N-(2-oxo-5-benzimidazolinyl)-2-naphthoamide.

Then, the procedures for desalting and washing were carried out in the same manner as in Example 1, to decrease the content of metal ions having a valence of at least 2 from 680 ppm to 610 ppm. The resultant material was dried, whereby a pigment derivative (c) was obtained. In the pigment derivative (c), the n=1 (compound having one sulfonic acid group) content ratio was 100%.
(Preparation of a Water-based Pigment Dispersion)

20 g of C.I. pigment red 171 having an average primary particle diameter of 90 nm (in which the content of metal and decrease the total amount of a chloride ion content and a sulfuric acid ion content from 80,000 to 60 ppm. Then, the resultant material was dried to obtain a pigment derivative (d).
(Preparation of a Water-based Pigment Dispersion)

20 g of C.I. pigment yellow 175 having an average primary particle diameter of 85 nm (in which the content of metal ions having a valence of at least 2 was 410 ppm), 3.8 g of the pigment derivative (d) and 110 g of deionized water were mixed, aqueous ammonia was added so as to adjust the pH of a mixture liquid to 9.0, and the mixture liquid was dispersed with a paint shaker in the presence of zirconia beads as media for approximately 5 hours, to obtain a water-based pigment dispersion.

Comparative Example 1

Benzimidazolone Pigment 20 g of C.I. pigment yellow 151 having an average primary particle diameter of 80 nm (in which the content of metal ions having a valence of at least 2 was 270 ppm), 4 g of a commercially available dye C.I. acid yellow 23 and 110 g of deionized water were mixed, aqueous ammonia was added so as to adjust the pH of a mixture liquid to 9.0, and the mixture liquid was dispersed with a paint shaker in the presence of zirconia beads as media for approximately 5 hours, to obtain a water-based pigment dispersion. The obtained water-based pigment dispersion was diluted so as to have a concentration of 3% by weight, and the diluted water-based pigment dispersion was dropped to NO.2 filter paper, to show bleeding of the dye.

Comparative Example 2

Benzimidazolone Pigment
(Preparation of a Pigment Derivative (b"))

50 parts of C.I. pigment yellow 180 was added to 750 parts of 95% by weight sulfuric acid at 10° C. or lower. Then, the temperature was increased to 20° C., and the mixture was stirred for 2 hours at 20° C., and then the mixture was poured into ice water, to obtain a precipitate. The precipitate was filtered and washed with deionized water, to obtain an aqueous paste of a sulfonated pigment.

Thereafter, the same ultrafiltration treatment as that in Example 2 was carried out, to decrease the content of metal ions having a valence of at least 2 from 760 ppm to 580 ppm and decrease the total amount of a chloride ion content and a sulfuric acid ion content from 64,000 to 50 ppm.

Then, the above-purified pigment derivative was treated in the same manner as in Example 1, to generate a triethanolamine salt, whereby an aqueous dispersion having a pigment derivative (b") concentration of 3% by weight was obtained. In the pigment derivative (b"), the n=1 (compound having one sulfonic acid group) content ratio was 10%, and the rest was a compound having at least two sulfonic acid groups.

(Preparation of a Water-based Pigment Dispersion)

20 g of C.I. pigment yellow 180 having an average primary particle diameter of 80 nm (in which the content of metal ions having a valence of at least 2 was 400 ppm), 18 g of the pigment derivative (b") and 110 g of deionized water were mixed, triethanolamine was added so as to adjust the pH of a mixture liquid to 9.0, and the mixture liquid was dispersed with a paint shaker in the presence of zirconia beads as media for approximately 5 hours, to obtain a water-based pigment dispersion.

Example 5

Quinacridone Pigment
(Preparation of a Pigment Dispersion (g))

200 parts of C.I. pigment violet 19 was added to 2,000 parts of 98% by weight sulfuric acid at 20° C. or lower. Then, the temperature was increased to 80° C., and the mixture was stirred for 2.5 hours at 80° C., and then the mixture was poured into ice water, to obtain a precipitate. The precipitate was filtered and washed with common salt water, to obtain 1,520 pares of an aqueous paste of a sulfonated pigment (310 parts when dried). In the sulfonated pigment, the n=1 (compound having one sulfonic acid group) content ratio was 95%, the n=2 (compound having two sulfonic acid groups) content ratio was 4%, and the rest was a non-substitution product.

Then, the aqueous paste of the sulfonated pigment was re-slurried with deionized water to prepare a 8% by weight aqueous dispersion. The above aqueous dispersion was desalted and washed by the use of a semipermeable membrane ("Spectra/Por", a fractional molecular weight 12,000–14,000, supplied by Spectrum Medical Industries), to decrease the content of metal ions having a valence of at least 2 from 950 ppm to 670 ppm and decrease the total amount of a chloride ion content and a sulfuric acid ion content from 76,000 ppm to 30 ppm. Then, deionized water was added to prepare an aqueous dispersion having a pigment derivative (g) concentration of 3% by weight.

(Preparation of a Water-based Pigment Dispersion)

20 g of C.I. pigment red 122 having an average primary particle diameter of 90 nm (in which the content of metal ions having a valence of at least 2 was 380 ppm), 55 g of the above aqueous dispersion of the pigment derivative (g) and 60 g of deionized water were mixed, aqueous ammonia was added so as to adjust the pH of a mixture liquid to 9.0, and the mixture liquid was dispersed with a paint shaker in the presence of zirconia beads as media for approximately 7 hours, to obtain a water-based pigment dispersion.

Example 6

Quinacridone Pigment
(Preparation of a Pigment Dispersion (g'))

10 g of a dry product of the same purified pigment derivative (g) as that obtained in Example 5 was added to a solution obtained by dissolving 15 parts of triethanolamine in 200 part of deionized water, to adjust a pH at 9.0 and to obtain a precipitate. The precipitate was filtered, washed with deionized water, and dried, to obtain 18 parts of a pigment derivative (g').

Pigment derivative (g')

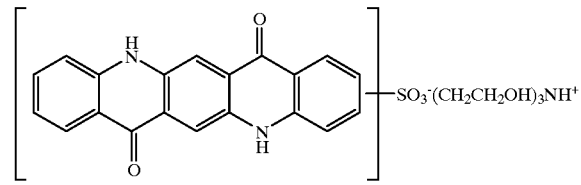

(Preparation of a Water-based Pigment Dispersion)

20 g of C.I. pigment violet 19 having an average primary particle diameter of 85 nm (in which the content of metal ions having a valence of at least 2 was 430 ppm), 1.8 g of the pigment derivative (g') and 110 g of deionized water were mixed, triethanolamine was added so as to adjust the pH of a mixture liquid to 9.0, and the mixture liquid was dispersed with a paint shaker in the presence of zirconia beads as media for approximately 7 hours, to obtain a water-based pigment dispersion.

Example 7

Quinacridone Pigment
(Preparation of a Pigment Derivative (h))

An aqueous paste containing a sulfonated pigment was obtained in the same sulfonation manner as in Example 5 except that C.I. pigment violet 19 was replaced with C.I. pigment red 122. In the sulfonated pigment, the n=1 (compound having one sulfonic acid group) content ratio was 90%, the n=2 (compound having two sulfonic acid groups content ratio was 3%, and the rest was a non-substitution product.

The procedures for desalting and washing thereafter were carried out in the same manner as in Example 5, to decrease the content of metal ion having a valence of at least 2 in the aqueous dispersion from 850 ppm to 740 ppm and decrease the total amount of a chloride ion content and a sulfuric acid ion content from 73,000 to 50 ppm. Then, deionized water was added, to prepare an aqueous dispersion having a pigment derivative (h) concentration of 3% by weight.

(Preparation of a Water-based Pigment Dispersion)

110 g of the aqueous dispersion of the pigment derivative (h) and 50 g of deionized water were mixed with 20 g of C.I. pigment red 122 having an average primary particle diameter of 90 nm (in which the content of metal ions having a valence of at least 2 was 450 ppm), and aqueous ammonia was added so as to adjust the pH of a mixture liquid to 9.0. Then, the same procedure as that in Example 5 was carried out, to obtain a water-based pigment dispersion.

Example 8

Quinacridone Pigment
(Preparation of a Pigment Derivative (i'))

200 parts of C.I. pigment red 202 was added to 2,000 parts of 98% by weight sulfuric acid at 20° C. or lower. Then, the temperature was increased to 80° C., and the mixture was stirred for 2.5 hours at 80° C., and then the mixture was poured into ice water, to obtain a precipitate. The precipitate was filtered and washed with common salt water, to obtain an aqueous paste of a sulfonated pigment. In the sulfonated pigment, the n=1 (compound having one sulfonic acid group) content ratio was 85%, the n=2 (compound having two sulfonic acid groups) content ratio was 10%, and the rest was a non-substitution product.

Then, the aqueous paste of the sulfonated pigment was re-slurried with deionized water to prepare a 1% by weight aqueous dispersion. The above aqueous dispersion was desalted and washed with an ultrafilter ("Centramate", supplied by Nihon Pall Ltd.) having a membrane ("Centramate cassette", a fractional molecular weight 300,000, supplied by Nihon Pall Ltd.) to decrease the content of metal ions having a valence of at least 2 from 610 ppm to 520 ppm and decrease the total amount of a chloride ion content and a sulfuric acid ion content from 80,000 to 60 ppm.

Then, the above-purified pigment derivative was treated in the same manner as in Example 5, to generate a triethanolamine salt, whereby an aqueous dispersion having a pigment derivative (i') concentration of 3% by weight was obtained.

Pigment derivative (i')

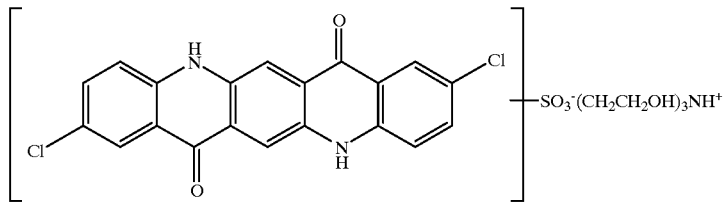

(Preparation of a Water-based Pigment Dispersion)

20 g of C.I. pigment violet 19 having an average primary particle diameter of 85 nm (in which the content of metal ions having a valence of at least 2 was 430 ppm), 85 g of the aqueous dispersion of the pigment derivative (i') and 40 g of deionized water were mixed, and triethanolamine was added so as to adjust the pH of a mixture liquid to 9.0. Then, the same procedure as that in Example 5 was carried out, to obtain a water-based pigment dispersion.

Example 9

Quinacridone Pigment
(Preparation of a Pigment Derivative (j'))

200 parts of C.I. pigment red 206 was added to 2,000 parts of 98% by weight sulfuric acid at 20° C. or lower. Then, the temperature was increased to 75° C., and the mixture was stirred for 5 hours at 75° C., and then the mixture was poured into ice water, to obtain a precipitate. The precipitate was filtered and washed with common salt water, to obtain 2,050 parts of an aqueous paste of a sulfonated pigment (320 parts when dried). In the sulfonated pigment, the n=1 (compound having one sulfonic acid group) content ratio was 85%, the n=2 (compound having two sulfonic acid groups) content ratio was 14%, and the rest was a non-substitution product.

Thereafter, the same ultrafiltration treatment as that in Example 7 was carried out, to decrease the content of metal ions having a valence of at least 2 from 870 ppm to 790 ppm and decrease the total amount of a chloride ion content and a sulfuric acid ion content from 80,000 to 60 ppm.

Then, the above-purified pigment derivative was treated in the same manner as in Example 5, to generate a triethanolamine salt, whereby an aqueous dispersion having a pigment derivative (j') concentration of 3% by weight was obtained.

Pigment derivative (j')

$$\left[\begin{array}{c}\text{Cl} \\ \text{structure with quinacridone core, two Cl substituents, two NH groups} \end{array}\right]\text{—SO}_3^-(\text{CH}_2\text{CH}_2\text{OH})_3\text{NH}^+$$

+

-continued $$\left[\begin{array}{c}\text{quinacridone structure} \end{array}\right]\text{—SO}_3^-(\text{CH}_2\text{CH}_2\text{OH})_3\text{NH}^+$$

(Preparation of a Water-based Pigment Dispersion)

20 g of C.I. pigment red 206 having an average primary particle diameter of 80 nm (in which the content of metal ions having a valence of at least 2 was 460 ppm), 70 g of the aqueous dispersion of the pigment derivative (j') and 40 g of deionized water were mixed, triethanolamine was added so as to adjust the pH of a mixture liquid to 9.0, and the mixture liquid was dispersed with a paint shaker in the presence of zirconia beads as media for approximately 7 hours, to obtain a pigment dispersion.

Comparative Example 3

Quinacridone Pigment (Preparation of a Pigment Derivative (g"))

An aqueous paste of a sulfonated pigment was obtained in the same manner as in Example 5 except that the reaction conditions for the sulfonation were changed to "for 5.5 hours at 95° C.".

Then, the aqueous paste of the sulfonated pigment was treated for desalting and washing in the same manner as in Example 5, to decrease the content of metal ions having a valence of at least 2 from 920 ppm to 630 ppm and decrease the total amount of a chloride ion content and a sulfuric acid ion content from 64,000 to 30 ppm. Then, deionized water was added to prepare an aqueous dispersion having a pigment derivative (g") concentration of 3%. The above pigment derivative (g") contained 95% of a pigment derivative having two sulfonic acid groups.

(Preparation of a Water-based Pigment Dispersion)

20 g of C.I. pigment red 122 having an average primary particle diameter of 90 nm (in which the content of metal ions having a valence of at least 2 was 450 ppm), 110 g of the aqueous dispersion of the pigment derivative (g") and 50 g of deionized water were mixed, aqueous ammonia was added so as to adjust the pH of a mixture liquid to 9.0, and the mixture liquid was dispersed with a paint shaker in the presence of zirconia beads as media for approximately 7 hours, to obtain a pigment dispersion. The obtained water-based pigment dispersion had a high viscosity and caused flocculation. Further, the water-based pigment dispersion was diluted so as to have a concentration of 3% by weight, and the diluted water-based pigment dispersion was dropped on No.2 filter paper, to show bleeding of the pigment derivative.

Comparative Example 4

Quinacridone Pigment 20 g of C.I. pigment red 122 having an average primary particle diameter of 90 nm (in which the content of metal ions having a valence of at least 2 was 450 ppm), 4 g of a commercially available dye C.I. acid red 249 and 110 g of deionized water were mixed, aqueous ammonia was added so as to adjust the pH of a mixture liquid to 9.0, and the mixture liquid was dispersed with a paint shaker in the presence of zirconia beads as media for approximately 5 hours, to obtain a water-based pigment dispersion. The obtained water-based pigment dispersion had a high viscosity and caused flocculation. Further, the water-based pigment dispersion was diluted so as to have a concentration of 3% by weight, and the diluted water-based pigment dispersion was dropped on No.2 filter paper, to show bleeding of the dye.

Comparative Example 5

Quinacridone Pigment

A water-based pigment dispersion was obtained in the same manner as in Example 5 except that the amount of the aqueous dispersion having a pigment derivative (g) concentration of 3% by weight was changed from 55 g to 15 g.

Comparative Example 6

Quinacridone Pigment

A water-based pigment dispersion was obtained in the same manner as in Example 5 except that the amount of the aqueous dispersion having a pigment derivative (g) concentration of 3% by weight was changed from 55 g to 250 g.

Example 10

Phthalocyanine Pigment (Preparation of a Pigment Derivative (m'))

200 parts of C.I. pigment blue 15:3 was added to 1,500 parts of 22% by weight fuming sulfuric acid and 400 parts of 98% by weight sulfuric acid at 20° C. or lower. Then, the temperature was increased to 47° C., and the mixture was stirred for 5 hours at 47° C., and then the mixture was poured into 3,500 part of ice water, to obtain a precipitate. The precipitate was filtered and washed with 6,000 parts of 5% by weight hydrochloric acid, to obtain 1,520 parts of an aqueous paste of a sulfonated pigment (310 parts when dried). In the sulfonated pigment, the n=1 (compound having one sulfonic acid group) content ratio was 90%, the n=2 (compound having two sulfonic acid groups) content ratio was 8%, and the rest was a non-substitution product.

Then, the aqueous paste of the sulfonated pigment. was re-slurried with deionized water to prepare a 1% by weight aqueous dispersion and triethanolamine was added so as to adjust the pH of the aqueous dispersion to 9.0. The resultant aqueous dispersion was desalted and washed with an ultra-filter ("Centramate", supplied by Nihon Pall Ltd.) having a membrane ("Centramate cassette", a fractional molecular weight 300,000, supplied by Nihon Pall Ltd.) to decrease the content of metal ions having a valence of at least 2 from 800 ppm to 480 ppm and decrease the total amount of a chloride ion content and a sulfuric acid ion content from 75,000 to 84 ppm. Then, the resultant material was concentrated to obtain an aqueous dispersion having a pigment derivative (m') concentration of 3% by weight.

Pigment derivative (m')

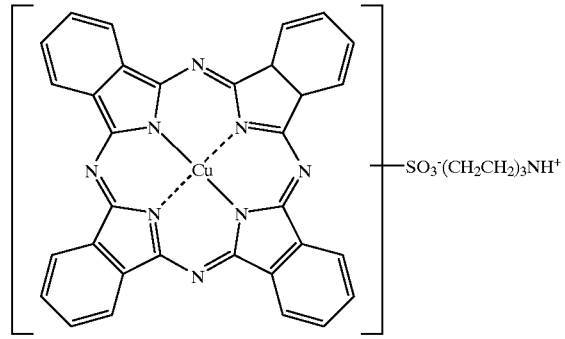

(Preparation of a Water-based Pigment Dispersion)

20 g of C.I. pigment blue 15:3 having an average primary particle diameter of 80 nm (in which the content of metal ions having a valence of at least 2 was 500 ppm), 70 g of the 3% pigment derivative (m') aqueous dispersion and 40 g of deionized water were mixed, triethanolamine was added so as to adjust the pH of a mixture liquid to 9.0, and the mixture liquid was dispersed with a paint shaker in the presence of zirconia beads as media for approximately 7 hours, to obtain a pigment dispersion.

Comparative Example 7

Phthalocyanine Pigment 20 g of C.I. pigment blue 15:3 having an average primary particle diameter of 80 nm (in which the content of metal ions having a valence of at least 2 was 500 ppm), 4 g of a commercially available dye C.I. direct blue 86 and 110 g of deionized water were mixed and the mixture was dispersed with a paint shaker in the presence of zirconia beads as media for approximately 5 hours, to obtain a water-based pigment dispersion. The obtained water-based pigment dispersion had a high viscosity and caused flocculation. Further, the pigment dispersion was diluted so as to have a concentration of 3% by weight, and the diluted water-based pigment dispersion was dropped on No.2 filter paper, to show a bleeding of the dye.

Example 11

Diketopyrrolopyrrole Pigment
(Preparation of a Pigment Derivative (n))

200 parts of C.I. pigment red 264 was added to 1,500 parts of 22% by weight fuming sulfuric acid at a temperature of 20° C. or lower. Then, the temperature was increased to 70° C., and the mixture was stirred for 5 hours at 70° C., and then the mixture was poured into 3,500 part of ice water, to obtain a precipitate. The precipitate was filtered and washed with 6,000 parts of 5% by weight hydrochloric acid, to obtain 1,300 parts of an aqueous paste of a sulfonated pigment (235 parts when dried). In the sulfonated pigment, the n=1 (compound having one sulfonic acid group) content ratio was 85%, the n=2 (compound having two sulfonic acid groups) content ratio was 10%, and the rest was a non-substitution product.

Then, the aqueous paste of the sulfonated pigment was re-slurried with deionized water to prepare a 1% by weight aqueous dispersion. The above aqueous dispersion was desalted and washed with an ultrafilter ("Centramate", supplied by Nihon Pall Ltd.) having a membrane ("Centramate cassette", a fractional molecular weight 300,000, supplied by Nihon Pall Ltd,.) to decrease the content of metal ions having a valence of at least 2 from 500 ppm to 460 ppm and decrease the total amount of a chloride ion content and a sulfuric acid ion content from 67,000 to 78 ppm. Then, the resultant material was concentrated to obtain an aqueous dispersion having a pigment derivative (n) concentration of 3% by weight.
(Preparation of a Water-based Pigment Dispersion)

20 g of C.I. pigment red 264 having an average primary particle diameter of 100 nm (in which the content of metal ion having a valence of at least 2 was 520 ppm), 80 g of the above 3% pigment derivative (n) aqueous dispersion and 40 g of deionized water were mixed, aqueous ammonia was added so as to adjust the pH of a mixture liquid to 9.0, and the mixture liquid was dispersed with a paint shaker in the presence of zirconia beads as media for approximately 7 hours, to obtain a pigment dispersion.

Comparative Example 8

Diketopyrrolopyrrole Pigment

An aqueous paste of a sulfonated pigment was obtained in the same manner as in Example 11 except that the reaction conditions for the sulfonation were changed to "for 10 hours at 99° C.".

Then, the aqueous paste of the sulfonated pigment was treated for desalting and washing in the same manner as in Example 5, to decrease the content of metal ions having a valence of at least 2 from 900 ppm to 650 ppm and decrease the total amount of a chloride ion content and a sulfuric acid ion content from 74,000 to 80 ppm. Then, deionized water was added to prepare an aqueous dispersion having a pigment derivative (m") concentration of 3% by weight. The above pigment derivative (m") contained 95% of a pigment derivative having two sulfonic acid groups.
(Preparation of a Water-based Pigment Dispersion)

20 g of C.I. pigment red 264 having an average primary particle diameter of 100 nm (in which the content of metal ions having a valence of at least 2 was 500 ppm), 80 g of the 3% by weight aqueous dispersion of the pigment derivative (m") and 40 g of deionized water were mixed, aqueous ammonia was added so as to adjust the pH of a mixture liquid to 9.0, and the mixture liquid was dispersed with a paint shaker in the presence of zirconia beads as media for approximately 5 hours, to obtain a water-based pigment dispersion. The obtained water-based pigment dispersion had a high viscosity and caused flocculation. Further, the water-based pigment dispersion was diluted so as to have a concentration of 3% by weight, and the diluted water-based pigment dispersion was dropped on No.2 filter paper, to show a bleeding of the dye.

Example 12

Quinacridone Pigment
(Preparation of a Pigment Derivative (g))

100 parts of C.I. pigment violet 19 was added to 1,000 parts of 98% by weight sulfuric acid at 20° C. or lower. Then, the temperature was increased to 80° C., and the mixture was stirred for 2 hours at 80° C., and then the mixture was poured into ice water, to obtain a precipitate. The precipitate was filtered, washed with acetone, and dried to obtain 116 parts of a sulfonated pigment. In the sulfonated pigment, the n=1 (compound having one sulfonic acid group) content ratio was 60%, the n=2 (compound having two sulfonic acid groups) content ratio was 16%, and the rest was a non-substitution product.

In the obtained sulfonated pigment, the content of metal ions having a valence of at least 2 was 260 ppm, and the total amount of a chloride ion content and a sulfuric acid ion content was 51 ppm. The above sulfonated pigment had no counter ion to the sulfonic acid group, and it was confirmed that it was a pigment derivative (g) in which 100% of the sulfonic acid group was liberated.
(Preparation of a Water-based Pigment Dispersion)

13.64 g of C.I. pigment violet 19 having an average primary particle diameter of 85 nm (in which the content of metal ions having a valence of at least 2 was 430 ppm), 1.36 g of the pigment derivative (g) and 85 g of deionized water were mixed, a 2% by weight triethanolamine aqueous solution was added so as to adjust the pH of a mixture liquid at 7.9, and the mixture liquid was dispersed with a paint shaker in the presence of zirconia beads as media for approximately 6 hours, to obtain a pigment dispersion. In the water-based pigment dispersion, the neutralization rate of sulufonic acid group of the pigment derivative (g) was 100%. The pigment dispersion was diluted so as to have a concentration of 3% by weight, and the diluted pigment dispersion was dropped on No.2 filter paper, to show no bleedings of the pigment derivative.

The pigment dispersions obtained in the above Examples and Comparative Examples were evaluated, and Table 1 shows the results.

TABLE 1

| | Content of metal ions having a valence of at least 2 (ppm) | Contents of chloride ion and sulfuric acid ion (ppm) | Dispersed average particle diameter (nm) | Dispersed particle diameter, at least 250 nm (%) | Conductivity (μs/cm) |
|---|---|---|---|---|---|
| Ex. 1 | 430 | 53 | 90 | <1 | 510 |
| Ex. 2 | 450 | 66 | 102 | <1 | 400 |
| Ex. 3 | 380 | 84 | 85 | <1 | 520 |
| Ex. 4 | 410 | 45 | 105 | <1 | 530 |
| Ex. 5 | 410 | 60 | 105 | <1 | 460 |
| Ex. 6 | 460 | 62 | 95 | <1 | 480 |
| Ex. 7 | 490 | 80 | 120 | <1 | 600 |
| Ex. 8 | 450 | 55 | 110 | <1 | 570 |
| Ex. 9 | 490 | 58 | 98 | <1 | 480 |
| Ex. 10 | 480 | 84 | 110 | <1 | 620 |
| Ex. 11 | 460 | 78 | 95 | <1 | 750 |
| Ex. 12 | 420 | 68 | 114 | <1 | 661 |
| CEx. 1 | 480 | 750 | 1,100 | >10 | 1,250 |
| CEx. 2 | 480 | 70 | 5,260 | >10 | 580 |
| CEx. 3 | 480 | 75 | 460 | >10 | 900 |
| CEx. 4 | 1,540 | 560 | 1,230 | >10 | 3,450 |
| CEx. 5 | 490 | 110 | 540 | >10 | 950 |
| CEx. 6 | 410 | 60 | 465 | >10 | 600 |
| CEx. 7 | 680 | 105 | 420 | >10 | 820 |
| CEx. 8 | 650 | 80 | 450 | >10 | 630 |

| | Surface tension (mN/m) | Viscosity (mPa·S) | pH | Stability in storage (50° C.) | Foamability | Zeta potential (mV) |
|---|---|---|---|---|---|---|
| Ex. 1 | 65.5 | 3.5 | 8.1 | 30 days or more | ◎ | −48 |
| Ex. 2 | 62.4 | 4.2 | 9.4 | 30 days or more | ◎ | −45 |
| Ex. 3 | 61.0 | 3.8 | 9.2 | 30 days or more | ◎ | −53 |
| Ex. 4 | 68.0 | 4.7 | 7.8 | 30 days or more | ◎ | −49 |
| Ex. 5 | 68.0 | 3.0 | 7.8 | 30 days or more | ◎ | −44 |
| Ex. 6 | 61.5 | 2.8 | 8.8 | 30 days or more | ◎ | −50 |
| Ex. 7 | 66.0 | 3.4 | 8.7 | 30 days or more | ◎ | −43 |
| Ex. 8 | 66.5 | 3.5 | 9.0 | 30 days or more | ◎ | −45 |
| Ex. 9 | 68.5 | 3.6 | 9.2 | 30 days or more | ◎ | −51 |
| Ex. 10 | 73.0 | 2.9 | 9.3 | 30 days or more | ◎ | −49 |
| Ex. 11 | 71.0 | 3.8 | 9.0 | 30 days or more | ◎ | −52 |
| Ex. 12 | 67.5 | 3.3 | 8.4 | 30 days or more | ◎ | −48 |
| CEx. 1 | Not measurable | 300 | 8.3 | X | Δ | −20 |
| CEx. 2 | Not measurable | 610 | 8.1 | X | Δ | −22 |
| CEx. 3 | 67.5 | 440 | 8.2 | X | Δ | −28 |
| CEx. 4 | Not measurable | 590 | 9.1 | X | Δ | −15 |
| CEx. 5 | Not measurable | 670 | 8.3 | X | Δ | −14 |
| CEx. 6 | Not measurable | 320 | 8.2 | X | Δ | −25 |
| CEx. 7 | Not measurable | 320 | 8.7 | X | Δ | −38 |
| CEx. 8 | 66.0 | 200 | 8.2 | X | Δ | −32 |

Ex. = Example, CEx. = Comparative Example

Examples 13 to 21

Comparative Examples 9 to 12

Raw materials having a composition shown in Table 2 were placed in a stirring tank and stirred and mixed with a disper. Then, the mixture was filtered with a 0.8-μm membrane filter to obtain inkjet recording liquids. The inkjet recording liquids were measured for particle diameter and viscosity, and evaluated for stability in storage, ejection stability, water resistance and anti-clogging properties.

Table 2 shows the results.

TABLE 2

| | Ex. 13 | Ex. 14 | Ex. 15 | Ex. 16 | CEx. 9 | CEx. 10 |
|---|---|---|---|---|---|---|
| Preparation of a water-based pigment dispersion | Ex. 1 | Ex. 2 | Ex. 3 | Ex. 4 | CEx. 1 | CEx. 2 |
| Amount of a water-based pigment dispersion (part) | 50 | 50 | 50 | 50 | 50 | 50 |
| Resin aqueous solution (part) | 0 | 0 | 1 | 3 | 0 | 0 |
| Glycerol (part) | 15 | 10 | 15 | 15 | 15 | 15 |
| Ethylene glycol (part) | 5 | 5 | 5 | 0 | 5 | 5 |
| Diethylene glycol monobutyl ether (part) | 0 | 5 | 0 | 5 | 0 | 0 |
| Surfactant (part) | 0 | 0 | 0.1 | 0.1 | 0.1 | 0.1 |
| Anti-fungal agent (part) | 0.1 | 0.1 | 0.1 | 0.1 | 0.1 | 0.1 |
| Deionized water (part) | 59.9 | 59.9 | 58.8 | 56.8 | 59.8 | 59.8 |
| Dispersed average particle diameter (nm) | 95 | 100 | 98 | 120 | 2,670 | 5,450 |
| Viscosity (cps) | 4.3 | 4.5 | 3.2 | 4.5 | Precipitation | Precipitation |
| Stability in storage (50° C.) | ○ | ○ | ○ | ○ | X | X |
| Ejection stability | ○ | ○ | ○ | ○ | X | X |
| Water resistance | ○ | ○ | ○ | ○ | X | X |
| Anti-clogging properties | ○ | ○ | ○ | ○ | X | X |
| Quality of printed product | ○ | ○ | ○ | ○ | X | X |

TABLE 2-continued

|  | Ex. 17 | Ex. 18 | Ex. 19 | Ex. 20 | Ex. 21 | CEx. 11 | CEx. 12 |
|---|---|---|---|---|---|---|---|
| Preparation of a water-based pigment dispersion | Ex. 5 | Ex. 6 | Ex. 7 | Ex. 8 | Ex. 9 | CEx. 3 | CEx. 4 |
| Amount of a water-based pigment dispersion (part) | 50 | 50 | 50 | 50 | 50 | 50 | 50 |
| Resin aqueous solution (part) | 3 | 0 | 3 | 0 | 0 | 0 | 0 |
| Glycerol (part) | 15 | 15 | 15 | 10 | 10 | 15 | 15 |
| Ethylene glycol (part) | 0 | 5 | 0 | 5 | 5 | 5 | 5 |
| Diethylene glycol monobutyl ether (part) | 5 | 0 | 5 | 5 | 5 | 0 | 0 |
| Surfactant (part) | 0.1 | 0 | 0.1 | 0 | 0 | 0.1 | 0.1 |
| Anti-fungal agent (part) | 0.1 | 0.1 | 0.1 | 0.1 | 0.1 | 0.1 | 0.1 |
| Deionized water (part) | 56.8 | 59.9 | 56.8 | 59.9 | 59.9 | 59.8 | 59.8 |
| Dispersed average particle diameter (nm) | 110 | 100 | 135 | 115 | 110 | 580 | 1,330 |
| Viscosity (cps) | 4.3 | 3.8 | 3.5 | 4.1 | 4.2 | Precipitation | Precipitation |
| Stability in storage (50° C.) | ○ | ○ | ○ | ○ | ○ | X | X |
| Ejection stability | ○ | ○ | ○ | ○ | ○ | X | X |
| Water resistance | ○ | ○ | ○ | ○ | ○ | X | X |
| Anti-clogging properties | ○ | ○ | ○ | ○ | ○ | X | X |
| Quality of printed product | ○ | ○ | ○ | ○ | ○ | X | X |

Ex. = Example,
CEx. = Comparative Example

Water-soluble resin solution: a styrene/acrylic water-soluble resin aqueous solution, "JOHNCRYL J 62", solid content approximately 34%, supplied by Johnson Polymer Corp.

Surfactant: anionic surfactant, "PELEX OT-P", solid content approximately 70%, supplied by Kao Corp.

Anti-fungal agent: "Proxel GXL" supplied by Zeneca K.K.

Example 22

Benzimidazolone Pigment
(Preparation of a Pigment Dispersion (a))

8.0 parts by weight of sodium hydroxide was dissolved in 200 part of deionized water, and 17.3 parts of 4-aminobenzensulfonic acid was added. The procedures thereafter were carried out in the same manner as in Example 1, to obtain 210 parts of an aqueous paste of a pigment derivative (a) (42 parts when dried).

Then, the aqueous paste of the pigment derivative (a) was treated for desalting and washing in the same manner as in Example 1, to decrease the content of metal ions having a valence of at least 2 from 850 ppm to 620 ppm and decrease the total amount of a chloride ion content and a sulfuric acid ion content from 50 ppm to 10 ppm. Then, deionized water was added to prepare an aqueous dispersion having a pigment derivative (a) concentration of 3% by weight. In the pigment derivative (a), the n=1 (compound having one sulfonic acid group) content ratio was 100%.
(Preparation of a Water-based Pigment Dispersion)

130 g of the aqueous dispersion of the pigment derivative (a) and 30 g of deionized water were mixed with 20 g of C.I. pigment yellow 151 having an average primary particle diameter of 80 nm (in which the content of metal ions having a valence of at least 2 was 270 ppm), a 1% sodium hydroxide aqueous solution was added so as to adjust the pH of a mixture liquid to 9.0, and the mixture liquid was dispersed with a paint shaker in the presence of zirconia beads as media for approximately 5 hours, to obtain a water-based pigment dispersion. In the water-based pigment dispersion, the neutralizatior rate of the sulfonic acid group of the pigment derivative (a) was 80%. Further, the obtained water-based pigment dispersion was diluted so as to have a concentration of 3% by weight, and the diluted water-based pigment dispersion was dropped to NO.2 filter paper, to show no bleedings.

Example 23

Benzimidazolone Pigment
(Preparation of a Pigment Derivative (b))

50 parts of C.I. pigment yellow 180 was added to 750 parts of 95% by weight sulfuric acid at 10° C. or lower. The procedures thereafter were carried out in the same manner as in Example 2, to obtain 294 parts of an aqueous paste of a sulfonated pigment (53 parts when dried). In the sulfonated pigment, the n=1 (compound having one sulfonic acid group) content ratio was 90%, the n=2 (compound having two sulfonic acid groups) content ratio was 8%, and the rest was a non-substitution product.

Then, the aqueous paste of the sulfonated pigment was treated for desalting and washing in the same manner as in Example 2, to decrease the content of metal ions having a valence of at least 2 from 860 ppm to 810 ppm and decrease the total amount of a chloride ion content and a sulfuric acid ion content from 60,000 to 80 ppm, and an aqueous dispersion having a pigment derivative (b) concentration of 3% by weight was prepared.
(Preparation of a Water-based Pigment Dispersion)

20 g of C.I. pigment yellow 180 having an average primary particle diameter of 80 nm (in which the content of metal ions having a valence of at least 2 was 400 ppm), 53 g the aqueous dispersion of the above pigment derivative (b) and 59 g of deionized water were mixed, a 1% sodium hydroxide aqueous solution was added so as to adjust the pH of a mixture liquid to 9.0, and the mixture liquid was dispersed with a paint shaker in the presence of zirconia beads as media for approximately 5 hours, to obtain a water-based pigment dispersion. In the water-based dispersion, the neutralization rate of the sulfonic acid group of the pigment derivative (b) was 80%.

Example 24

Benzimidazolone Pigment
(Preparation of a Pigment Derivative (c))

An aqueous paste of a pigment derivative (c) was obtained in the same manner as in Example 22 except that 23.3 parts of the acetoacetylbenzimidazole was replaced with equimolar amount (33.8 parts) of 3-hydroxy-N-(2-oxo-5-benzimidazolinyl)-2-naphthoamide.

Then, the aqueous paste of the pigment derivative (c) was treated for desalting and washing in the same manner as in Example 22, to decrease the content of metal ions having a valence of at least 2 from 680 ppm to 610 ppm. The resultant material was concentrated, to obtain an aqueous dispersion having a concentration of 5% by weight. In the pigment derivative (c), the n=1 (compound having one sulfonic acid group) content ratio was 100%.
(Preparation of a Water-based Pigment Dispersion)

20 g of C.I. pigment red 171 having an average primary particle diameter of 90 nm (in which the content of metal ions having a valence of at least 2 was 380 ppm), 80 g of the aqueous dispersion of the pigment derivative (c) and 34 g of deionized water were mixed, a 1% by weight potassium hydroxide aqueous solution was added so as to adjust the pH of a mixture liquid to 9.0, and the mixture liquid was dispersed with a paint shaker in the presence of zirconia beads as media for approximately 5 hours, to obtain a water-based pigment dispersion. In the water-based pigment dispersion, the neutralization rate of the sulfonic acid group of the pigment derivative (c) was 83%.

Example 25

Benzimidazolone Pigment
(Preparation of a Pigment Derivative (d))

An aqueous paste of a sulfonated pigment was obtained in the same manner as in Example 23 except that C.I. pigment yellow 180 was replaced with C.I. pigment yellow 175. In the sulfonated pigment, the n=1 (compound having one sulfonic acid group) content ratio was 85%, the n=2 (compound having two sulfonic acid groups) content ratio was 12%, and the rest was a non-substitution product.

Thereafter, the same ultrafiltration treatment as that in Example 23 was carried out, to decrease the content of metal ions having a valence of at least 2 from 690 ppm to 540 ppm and decrease the total amount of a chloride ion content and a sulfuric acid ion content from 80,000 to 60 ppm. Then, the resultant material was concentrated to obtain an aqueous dispersion having a pigment derivative (d) concentration of 3% by weight.
(Preparation of a Water-based Pigment Dispersion)

20 g of C.I. pigment yellow 175 having an average primary particle diameter of 85 nm (in which the content of metal ion having a valence of at least 2 was 410 ppm), 53 g of the aqueous dispersion of the pigment derivative (d) and 59 g of deionized water were mixed, a 1% sodium hydroxide aqueous solution was added so as to adjust the pH of a mixture liquid to 9.0, and the mixture liquid was dispersed with a paint shaker in the presence of zirconia beads as media for approximately 5 hours, to obtain a water-based pigment dispersion. In the water-based pigment dispersion, the neutralization rate of the sulfonic acid group of the pigment derivative (d) was 80%.

Comparative Example 13

Benzimidazolone Pigment 20 g of C.I. pigment yellow 151 having an average primary particle diameter of 80 nm (in which the content of metal ions having a valence of at least 2 was 270 ppm), 4 g of a commercially available dye C.I. acid yellow 23 and 110 g of deionized water were mixed, a 1% sodium hydroxide aqueous solution was added so as to adjust the pH of a mixture liquid to 9.0, and the mixture liquid was dispersed with a paint shaker in the presence of zirconia beads as media for approximately 5 hours, to obtain a water-based pigment dispersion. The obtained water-based pigment dispersion was diluted so as to have a concentration of 3% by weight, and the diluted water-based pigment dispersion was dropped to NO.2 filter paper, to show bleeding of the dye.

Comparative Example 14

Benzimidazolone Pigment
(Preparation of a Pigment Derivative (b"))

50 parts of C.I. pigment yellow 180 was added to 750 parts of 95% by weight sulfuric acid at 1° C. or lower. Then, the temperature was increased to 20° C., and the mixture was stirred for 2 hours at 20° C., and then the mixture was poured into ice water, to obtain a precipitate. The precipitate was filtered and washed with deionized water, to obtain an aqueous paste of a sulfonated pigment.

Thereafter, the same ultrafiltration treatment as that in Example 23 was carried out, to decrease the content of metal ions having a valence of at least 2 from 760 ppm to 580 ppm and decrease the total amount of a chloride ion content and a sulfuric acid ion content from 64,000 to 50 ppm, send an aqueous dispersion having a pigment derivative (b") concentration of 3% by weight was obtained. In the pigment derivative (b"), the n=1 (compound having one sulfonic acid group) content ratio was 10%, and the rest was a compound having at least two sulfonic acid groups.
(Preparation of a Water-based Pigment Dispersion)

20 g of C.I. pigment yellow 180 having an average primary particle diameter of 80 nm (in which the content of metal ion having a valence of at least 2 was 400 ppm), 53 g of the aqueous dispersion of the pigment derivative (b") and 59 g of deionized water were mixed and the mixture was dispersed with a paint shaker in the presence of zirconia beads as media for approximately 5 hours, to obtain a water-based pigment dispersion.

Example 26

Quinacridone Pigment
(Preparation of a Pigment Dispersion (g))

200 parts of C.I. pigment violet 19 was added to 2,000 parts of 98% by weight sulfuric acid at 20° C. or lower. The procedures thereafter were carried out in the same manner as in Example 5, to obtain 1,520 parts of an aqueous paste of a sulfonated pigment (310 parts when dried). In the sulfonated pigment, the n=1 (compound having one sulfonic acid group) content ratio was 95%, the n=2 (compound having two sulfonic acid groups) content ratio was 4%, and the rest was a non-substitution product.

Then, the aqueous paste of the sulfonated pigment was treated for desalting and washing in the same manner as in Example 5, to decrease the content of metal ions having a valence of at least 2 from 950 ppm to 670 ppm and decrease the total amount of a chloride ion content and a sulfuric acid ion content from 76,000 ppm to 30 ppm. Then, deionized water was added to prepare an aqueous dispersion having a pigment derivative (g) concentration of 3% by weight.
(Preparation of a Water-based Pigment Dispersion)

20 g of C.I. pigment violet 19 having an average primary particle diameter of 85 nm (in which the content of metal ions having a valence of at least 2 was 430 ppm), 55 g of the above aqueous dispersion of the pigment derivative (g) and 110 g of deionized water were mixed, a 1% by weight sodium hydroxide aqueous solution was added so as to adjust the pH of a mixture liquid to 9.0, and the mixture liquid was dispersed with a paint shaker in the presence of zirconia beads as media for approximately 7 hours, to obtain a water-based pigment dispersion. In the water-based pigment dispersion, the neutralization rate of the sulfonic acid group of the pigment derivative (g) was 70%. The water-based pigment dispersion was diluted so as to have a concentration of 3% by weight, and the diluted water-based pigment dispersion was dropped to NO.2 filter paper, to show no bleeding of the pigment derivative.

Example 27

Quinacridone Pigment
(Preparation of a Pigment Derivative (h))

An aqueous paste containing a sulfonated pigment was obtained in the same sulfonation manner as in Example 26 except that C.I. pigment violet 19 was replaced with C.I. pigment red 122. In the sulfonated pigment, the n=1 (compound having one sulfonic acid group) content ratio was 90%, the n=2 (compound having two sulfonic acid groups) content ratio was 3%, and the rest was a non-substitution product.

The procedures thereafter were carried out for desalting and washing in the same manner as in Example 26, to decrease the content of metal ions having a valence of at least 2 in the aqueous dispersion from 850 ppm to 740 ppm and decrease the total amount of a chloride ion content and a sulfuric acid ion content from 73,000 to 50 ppm. Then, deionized water was added thereto, to prepare an aqueous dispersion having a pigment derivative (h) concentration of 3% by weight.
(Preparation of a Water-based Pigment Dispersion)

20 g of C.I. pigment red 122 having an average primary particle diameter of 90 nm (in which the content of metal ions having a valence of at least 2 was 450 ppm), 110 g of the aqueous dispersion of the pigment derivative (h) and 50 g of deionized water were mixed and a 1% by weight sodium hydroxide aqueous solution was added so as to adjust the pH of a mixture liquid to 9.0. Then, the same procedure as that in Example 5 was carried out, to obtain a water-based pigment dispersion. In the water-based pigment dispersion, the neutralization rate of the sulfonic acid group of the pigment derivative (h) was 80%.

Example 28

Quinacridone Pigment
(Preparation of a Pigment Derivative (i))

200 parts of C.I. pigment red 202 was added to 2,000 parts of 98% by weight sulfuric acid at 20° C. or lower. The procedures thereafter were carried out in the same manner as in Example 8, to obtain an aqueous paste of a sulfonated pigment. In the sulfonated pigment, the n=1 (compound having one sulfonic acid group) content ratio was 85%, the n=2 (compound having two sulfonic acid groups) content ratio was 10%, and the rest was a non-substitution product.

Then, the aqueous paste of the sulfonated pigment was treated for desalting and washing in the same manner as in Example 8, to decrease the content of metal ions having a valence of at least 2 from 610 ppm to 520 ppm and decrease the total amount of a chloride ion content and a sulfuric acid ion content from 80,000 to 60 ppm. Then, the resultant material was concentrated to prepare an aqueous dispersion having a pigment derivative (i) concentration of 3% by weight.
(Preparation of a Water-based Pigment Dispersion)

20 g of C.I. pigment violet 19 having an average primary particle diameter of 85 nm (in which the content of metal ions having a valence of at least 2 was 430 ppm), 85 g of the aqueous dispersion of the pigment derivative (i) and 40 g of deionized water were mixed, and a 1% sodium hydroxide aqueous solution was added so as to adjust the pH of a mixture liquid to 9.0. Then, the same procedure as that in Example 26 was carried out, to obtain a water-based pigment dispersion. In the water-based pigment dispersion, the neutralization rate of the sulfonic acid group of the pigment derivative (i) was 75%.

Example 29

Quinacridone Pigment
(Preparation of a Pigment Derivative (j))

200 parts of C.I. pigment red 206 was added to 2,000 parts of 98% by weight sulfuric acid at 20° C. or lower. The procedures thereafter were carried out in the same manner as in Example 9, to obtain 2,050 parts of an aqueous paste of a sulfonated pigment (320 parts when dried). In the sulfonated pigment, the n=1 (compound having one sulfonic acid group) content ratio was 85%, the n=2 (compound having two sulfonic acid groups) content ratio was 14%, and the rest was a non-substitution product.

Thereafter, the procedures for ultrafiltration were carried out in the same manner as in Example 28, to decrease the content of metal ions having a valence of at least 2 from 870 ppm to 790 ppm and decrease the total amount of a chloride ion content and a sulfuric acid ion content from 80,000 to 60 ppm. Then, the resultant material was concentrated to prepare an aqueous dispersion having a pigment derivative (j) concentration of 3% by weight was obtained.
(Preparation of a Water-based Pigment Dispersion)

20 g of C.I. pigment red 206 having an average primary particle diameter of 80 nm (in which the content of metal ions having a valence of at least 2 was 460 ppm), 70 g of the aqueous dispersion of the pigment derivative (j) and 40 g of deionized water were mixed, a 1% by weight potassium hydroxide aqueous solution was added so as to adjust the pH of a mixture liquid to 9.0, and the mixture liquid was dispersed with a paint shaker in the presence of zirconia beads as media for approximately 7 hours, to obtain a pigment dispersion. In the water-based pigment dispersion, the neutralization rate of the sulfonic acid group of the pigment derivative (j) was 80%.

Comparative Example 15

Quinacridone Pigment
(Preparation of a Pigment Derivative (g"))

An aqueous dispersion having a pigment derivative (g") concentration of 3% by weight was obtained in the same manner as in Comparative Example 3. The pigment derivative (g") contained 95% of a pigment derivative having two sulfonic acid groups.

(Preparation of a Water-based Pigment Dispersion)

20 g of C.I. pigment red 122 having an average primary particle diameter of 90 nm (in which the content of metal ions having a valence of at least 2 was 450 ppm), 110 g of the aqueous dispersion of the pigment derivative (g") and 50 g of deionized water were mixed, a 1% by weight sodium hydroxide aqueous solution was added so as to adjust the pH of a mixture liquid to 9.0, and the mixture liquid was dispersed with a paint shaker in the presence of zirconia beads as media for approximately 7 hours, to obtain a water-based pigment dispersion. The obtained water-based pigment dispersion had a high viscosity and caused flocculation. Further, the water-based pigment dispersion was diluted so as to have a concentration of 3% by weight, and the diluted water-based pigment dispersion was dropped on No.2 filter paper, to show bleeding of the pigment derivative.

Comparative Example 16

Quinacridone Pigment 20 g of C.I. pigment red 122 having an average primary particle diameter of 90 nm (in which the content of metal ion having a valence of at least 2 was 450 ppm), 4 g of a commercially available dye C.I. acid red 249 and 110 g of deionized water were mixed, a 1% by weight sodium hydroxide aqueous solution was added so as to adjust the pH of a mixture liquid to 9.0, and the mixture liquid was dispersed with a paint shaker in the presence of zirconia beads as media for approximately 5 hours, to obtain a water-based pigment dispersion. The obtained water-based pigment dispersion had a high viscosity and caused flocculation. Further, the water-based pigment dispersion was diluted so as to have a concentration of 3% by weight, and the diluted water-based pigment dispersion was dropped on No.2 filter paper, to show bleeding of the dye.

Comparative Example 17

Quinacridone Pigment

A pigment dispersion was obtained in the same manner as in Example 26 except that the amount of the aqueous dispersion having a pigment derivative (g) concentration of 3% by weight was changed from 55 g to 15 g.

Comparative Example 18

Quinacridone Pigment

A pigment dispersion was obtained in the same manner as in Example 26 except that the amount of the aqueous dispersion having a pigment derivative (g) concentration of 3% by weight was changed from 55 g to 250 g.

Example 30

Phthalocyanine Pigment
(Preparation of a Pigment Derivative (m))

200 parts of C.I. pigment blue 15:3 was added to a mixture of 1,500 parts of 22% by weight fuming sulfuric acid and 400 parts of 98% by weight sulfuric acid at 20° C. or lower. The procedures thereafter were carried out in the same manner as in Example 10, to obtain 1,520 parts of an aqueous paste of a sulfonated pigment (310 parts when dried). In the sulfonated pigment, the n=1 (compound having one sulfonic acid group) content ratio was 90%, the n=2 (compound having two sulfonic acid groups) content ratio was 8%, and the rest was a non-substitution product.

Then, the aqueous paste of the sulfonated pigment was treated for desalting and washing in the same manner as in Example 10, to decrease the content of metal ions having a valence of at least 2 from 800 ppm to 480 ppm and decrease the total amount of a chloride ion content and a sulfuric acid ion content from 75,000 to 84 ppm. Then, the resultant material was concentrated to obtain an aqueous dispersion having a pigment derivative (m) concentration of 3% by weight.

(Preparation of a Water-based Pigment Dispersion)

20 g of C.I. pigment blue 15:3 having an average primary particle diameter of 80 nm (in which the content of metal ions having a valence of at least 2 was 500 ppm), 70 g of the aqueous dispersion of the pigment derivative (m) and 40 g of deionized water were mixed, a 1% by weight potassium hydroxide aqueous solution was added so as to adjust pH of a mixture liquid to 9.0, and the mixture liquid was dispersed with a paint shaker in the presence of zirconia beads as media for approximately 7 hours, to obtain a pigment dispersion. In the water-based pigment dispersion, the neutralization rate of the sulfonic acid group of the pigment derivative (m) was 80%.

Comparative Example 19

Phthalocyanine Pigment 20 g of C.I. pigment blue 15:3 having an average primary particle diameter of 80 nm (in which the content of metal ions having a valence of at least 2 was 500 ppm), 4 g of a commercially available dye C.I. direct blue 86 and 110 g of deionized water were mixed and the mixture was dispersed with a paint shaker in the presence of zirconia beads as media for approximately 5 hours, to obtain a water-based pigment dispersion. The obtained water-based pigment dispersion had a high viscosity and caused flocculation. Further, the pigment dispersion was diluted so as to have a concentration of 3% by weight, and the diluted water-based pigment dispersion was dropped on No.2 filter paper, to show a bleeding of the dye.

Example 31

Diketopyrrolopyrrole Pigment
(Preparation of a Pigment Derivative (n))

An aqueous dispersion having a pigment derivative (n) concentration of 3% by weight was prepared in the same manner as in Example 11.

(Preparation of a Water-based Pigment Dispersion)

20 g of C.I. pigment red 264 having an average primary particle diameter of 100 nm (in which the content of metal ions having a valence of at least 2 was 520 ppm), 80 g of the aqueous dispersion of the pigment derivative (n) and 40 g of deionized water were mixed, a 1% by weight sodium hydroxide aqueous solution was added so as to adjust the pH of a mixture liquid to 9.0, and the mixture liquid was dispersed with a paint shaker in the presence of zirconia beads as media for approximately 7 hours, to obtain a pigment dispersion. In the water-based pigment dispersion, the neutralization rate of the sulfonic acid group of the pigment derivative (n) was 75%.

Comparative Example 20

Diketopyrrolopyrrole Pigment

An aqueous paste of a sulfonated pigment was obtained in the same manner as in Example 31 except that the reaction conditions for the sulfonation were changed to "for 10 hours at 99° C.".

Then, the aqueous paste of the sulfonated pigment was treated for desalting and washing in the same manner as in Example 26, to decrease the content of metal ions having a valence of at least 2 from 900 ppm to 650 ppm and decrease the total amount of a chloride ion content and a sulfuric acid ion content from 74,000 to 80 ppm. Then, deionized water was added to prepare an aqueous dispersion having a pigment derivative (n") concentration of 3% by weight. The above pigment derivative (n") contained 95% of a pigment derivative having two sulfonic acid groups.

(Preparation of a Water-based Pigment Dispersion)

20 g of C.I. pigment red 264 having an average primary particle diameter of 100 nm (in which the content of metal ions having a valence of at least 2 was 500 ppm), 80 g of the aqueous dispersion of the pigment derivative (n") and 40 g of deionized water were mixed, and the mixture liquid was dispersed with a paint shaker in the presence of zirconia beads as media for approximately 5 hours, to obtain a pigment dispersion. The obtained water-based pigment dispersion had a high viscosity and caused flocculation. Further, the water-based pigment dispersion was diluted so as to have a concentration of 3% by weight, and the diluted water-based pigment dispersion was dropped on No.2 filter paper, to show a bleeding of the dye.

Example 32

Quinacridone Pigment
(Preparation of a Pigment Derivative (g))

100 parts of C.I. pigment violet 19 was added to 1,000 parts of 98% by weight sulfuric acid at 20° C. or lower. Then, the temperature was increased to 80° C., and the mixture was stirred for 2 hours at 80° C., and then the mixture was poured into ice water, to obtain a precipitate. The precipitate was filtered and washed with acetone, and a sulfonated pigment was dried to obtain 116 parts of the sulfonated pigment. In the sulfonated pigment, the n=1 (compound having one sulfonic acid group) content ratio was 60%, the n=2 (compound having two sulfonic acid groups) content ratio was 16%, and the rest was a non-substitution product.

In the obtained sulfonated pigment, the content of metal ions having a valence of at least 2 was 260 ppm, and the total amount of a chloride ion content and a sulfuric acid ion content was 51 ppm. The above sulfonated pigment had no counter ion to the sulfonic acid group, and it was confirmed that it was a pigment derivative in which 100% of the sulfonic acid group was liberated.

(Preparation of a Water-based Pigment Dispersion)

13.64 g of C.I. pigment violet 19 having an average primary particle diameter of 85 nm (in which the content of metal ion having a valence of at least 2 was 430 ppm), 1.36 g of the pigment derivative (g) and 85 g of deionized water were mixed, and the mixture was dispersed with a paint shaker in the presence of zirconia beads as media for approximately 6 hours, to obtain a pigment dispersion. The pigment dispersion was diluted so as to have a concentration of 3% by weight, and the diluted pigment dispersion was dropped on No.2 filter paper, to show no bleedings of the pigment derivative.

The water-based pigment dispersions obtained in the above Examples and Comparative Examples were evaluated, and Table 3 shows the results.

TABLE 3

| | Content of metal ions having a valence of at least 2 (ppm) | Contents of chloride ion and sulfuric acid ion (ppm) | Dispersed average particle diameter (nm) | Dispersed particle diameter, at least 250 nm (%) | Conductivity ($\mu$S/cm) | Surface tension (mN/m) |
|---|---|---|---|---|---|---|
| Ex. 22 | 470 | 70 | 100 | <1 | 470 | 62.0 |
| Ex. 23 | 450 | 66 | 95 | <1 | 450 | 63.2 |
| Ex. 24 | 380 | 84 | 80 | <1 | 410 | 61.5 |
| Ex. 25 | 450 | 75 | 110 | <1 | 540 | 65.0 |
| Ex. 26 | 500 | 80 | 95 | <1 | 600 | 70.0 |
| Ex. 27 | 490 | 80 | 100 | <1 | 520 | 65.1 |
| Ex. 28 | 450 | 55 | 95 | <1 | 550 | 67.0 |
| Ex. 29 | 490 | 58 | 90 | <1 | 510 | 62.5 |
| Ex. 30 | 480 | 84 | 120 | <1 | 580 | 72.5 |
| Ex. 31 | 460 | 78 | 100 | <1 | 720 | 71.0 |
| Ex. 32 | 414 | 60 | 81 | <1 | 1,191 | 63.4 |
| CEx. 13 | 1,430 | 85 | 1,750 | >10 | 860 | Not measurable |
| CEx. 14 | 480 | 70 | 4,300 | >10 | 460 | Not measurable |
| CEx. 15 | 480 | 75 | 460 | >10 | 810 | 67.2 |
| CEx. 16 | 490 | 110 | 450 | >10 | 920 | 67.5 |
| CEx. 17 | 450 | 75 | 550 | >10 | 550 | Not measurable |
| CEx. 18 | 520 | 85 | 350 | >10 | 720 | Not measurable |
| CEx. 19 | 680 | 105 | 420 | >10 | 820 | Not measurable |
| CEx. 20 | 650 | 80 | 480 | >10 | 510 | 68.3 |

| | Viscosity (mPa.S) | pH | Stability in storage (50° C.) | Foamability | Zeta potential (mV) |
|---|---|---|---|---|---|
| Ex. 22 | 2.5 | 8.5 | 30 days or more | ◉ | −37 |
| Ex. 23 | 4.0 | 8.4 | 30 days or more | ◉ | −50 |
| Ex. 24 | 3.2 | 8.7 | 30 days or mare | ◉ | −42 |

TABLE 3-continued

| | | | | | |
|---|---|---|---|---|---|
| Ex. 25 | 4.0 | 8.0 | 30 days or more | ⊚ | −43 |
| Ex. 26 | 4.2 | 8.5 | 30 days or more | ⊚ | −41 |
| Ex. 27 | 2.0 | 8.4 | 30 days or more | ⊚ | −50 |
| Ex. 28 | 3.2 | 8.7 | 30 days or more | ⊚ | −49 |
| Ex. 29 | 3.5 | 9.0 | 30 days or more | ⊚ | −45 |
| Ex. 30 | 2.6 | 9.2 | 30 days or more | ⊚ | −55 |
| Ex. 31 | 4.1 | 8.8 | 30 days or more | ⊚ | −51 |
| Ex. 32 | 3.4 | 2.8 | 30 days or more | ⊚ | −49 |
| CEx. 13 | 230 | 8.6 | X | Δ | −20 |
| CEx. 14 | 490 | 8.8 | X | Δ | −25 |
| CEx. 15 | 380 | 8.3 | X | Δ | −45 |
| CEx. 16 | 720 | 8.2 | X | Δ | −18 |
| CEx. 17 | 300 | 8.5 | X | ⊚ | −28 |
| CEx. 18 | 200 | 8.5 | X | Δ | −30 |
| CEx. 19 | 320 | 8.7 | X | Δ | −38 |
| CEx. 20 | 280 | 8.6 | X | Δ | −35 |

Ex. = Example,
CEx. = Comparative Example

Examples 33 to 42

Comparative Examples 21 to 26

Raw materials having a composition shown in Table 4 were placed in a stirring tank and stirred and mixed with a disper. Then, the mixture was filtered with a 0.8-μm membrane filter to obtain inkjet recording liquids. The inkjet recording liquids were measured for particle diameter and viscosity, and evaluated for stability in storage, ejection stability, water resistance and anti-clogging properties.

Table 4 shows the results.

TABLE 4

| | Ex. 33 | Ex. 34 | Ex. 35 | Ex. 36 | CEx. 21 | CEx. 22 |
|---|---|---|---|---|---|---|
| Preparation of a water-based pigment dispersion | Ex. 22 | Ex. 23 | Ex. 24 | Ex. 25 | CEx. 13 | CEx. 14 |
| Amount of a water-based pigment dispersion (part) | 50 | 50 | 50 | 50 | 50 | 50 |
| Resin aqueous solution (part) | 1 | 0 | 1 | 3 | 3 | 0 |
| Glycerol (part) | 10 | 10 | 15 | 15 | 15 | 15 |
| Ethylene glycol (part) | 5 | 5 | 5 | 0 | 5 | 5 |
| Diethylene glycol monobutyl ether (part) | 5 | 5 | 0 | 5 | 0 | 5 |
| Surfactant (part) | 0 | 0 | 0.1 | 0.1 | 0.1 | 0 |
| Anti-fungal agent (part) | 0.1 | 0.1 | 0.1 | 0.1 | 0.1 | 0.1 |
| Deionized water (part) | 58.9 | 59.9 | 58.8 | 56.8 | 56.8 | 54.9 |
| Dispersed average particle diameter (nm) | 95 | 100 | 90 | 120 | 280 | 2,430 |
| Viscosity (cps) | 3.2 | 4.5 | 3.8 | 4.5 | 9.2 | Precipitation |
| Stability in storage (50° C.) | ○ | ○ | ○ | ○ | X | X |
| Ejection stability | ○ | ○ | ○ | ○ | X | X |
| Water resistance | ○ | ○ | ○ | ○ | ○ | X |
| Anti-clogging properties | ○ | ○ | ○ | ○ | X | X |
| Quality of printed product | ○ | ○ | ○ | ○ | X | X |

| | Ex. 37 | Ex. 38 | Ex. 39 | Ex. 40 | CEx. 23 |
|---|---|---|---|---|---|
| Preparation of a water-based pigment dispersion | Ex. 26 | Ex. 27 | Ex. 28 | Ex. 29 | CEx. 15 |
| Amount of a water-based pigment dispersion (part) | 50 | 50 | 50 | 50 | 50 |
| Resin aqueous solution (part) | 1 | 3 | 0 | 0 | 0 |
| Glycerol (part) | 15 | 15 | 10 | 10 | 15 |
| Ethylene glycol (part) | 5 | 0 | 5 | 5 | 5 |
| Diechylene glycol monobutyl ether (part) | 0 | 5 | 5 | 5 | 0 |

TABLE 4-continued

|  |  |  |  |  |  |
|---|---|---|---|---|---|
| Surfactant (part) | 0 | 0.1 | 0 | 0 | 0.1 |
| Anti-fungal agent (part) | 0.1 | 0.1 | 0.1 | 0.1 | 0.1 |
| Deionized water (part) | 58.9 | 56.8 | 59.9 | 59.9 | 59.8 |
| Dispersed average particle diameter (nm) | 100 | 90 | 96 | 105 | 620 |
| Viscosity (cps) | 4.0 | 3.0 | 3.2 | 4.1 | Precipitation |
| Stability in storage (50° C.) | ○ | ○ | ○ | ○ | X |
| Ejection stability | ○ | ○ | ○ | ○ | X |
| Water resistance | ○ | ○ | ○ | ○ | X |
| Anti-clogging properties | ○ | ○ | ○ | ○ | X |
| Quality of printed product | ○ | ○ | ○ | ○ | X |

|  | CEx. 24 | Ex. 41 | CEx. 25 | Ex. 42 | CEx. 26 |
|---|---|---|---|---|---|
| Preparation of a water-based pigment dispersion | CEx. 16 | Ex. 30 | CEx. 19 | Ex. 31 | CEx. 20 |
| Amount of a water-based pigment dispersion (part) | 50 | 50 | 50 | 50 | 50 |
| Resin aqueous solution (part) | 0 | 1 | 1 | 3 | 3 |
| Glycerol (part) | 15 | 10 | 10 | 15 | 15 |
| Ethylene glycol (part) | 5 | 5 | 5 | 5 | 5 |
| Diethylene glycol monobutyl ether (part) | 0 | 5 | 5 | 0 | 0 |
| Surfactant (part) | 0.1 | 0 | 0 | 0.1 | 0.1 |
| Anti-fungal agent (part) | 0.1 | 0.1 | 0.1 | 0.1 | 0.1 |
| Deionized water (part) | 59.8 | 58.9 | 58.9 | 56.8 | 56.8 |
| Dispersed average particle diameter (nm) | 1,100 | 110 | 580 | 100 | 1,780 |
| Viscosity (cps) | Precipitation | 3.1 | 25.6 | 4.5 | Precipitation |
| Stability in storage (50° C.) | X | ○ | X | ○ | X |
| Ejection stability | X | ○ | X | ○ | X |
| Water resistance | X | ○ | X | ○ | X |
| Anti-clogging properties | X | ○ | X | ○ | X |
| Quality of printed product | X | ○ | X | ○ | X |

Ex. = Example,
CEx. = Comparative Example

Example 43

Quinacridone Pigment (Preparation of a Pigment Dispersion (g))

200 parts of C.I. pigment violet 19 was added to 2,000 parts of 98% by weight sulfuric acid at 20° C. or lower. Then, the temperature was increased to 85° C., and the mixture was stirred for 2.5 hours at 85° C., and then the mixture was poured into ice water, to obtain a precipitate. The precipitate was filtered and washed with common salt water, to obtain 1,500 parts of an aqueous paste of a sulfonated pigment (300 parts when dried). In the sulfonated pigment, the n=1 (compound having one sulfonic acid group) content ratio was 59%, the n=2 (compound having two sulfonic acid groups) content ratio was 22%, and the rest was a non-substitution product.

Then, the aqueous paste of the sulfonated pigment was re-slurried with deionized water to prepare a 2% by weight aqueous dispersion (150 l). The above aqueous dispersion was boiled for 3 hours. The resultant aqueous dispersion was cooled to an ordinary temperature, and then, purified by an ultrafiltration with deionized water in an amount 4 times as large as 150 liters. The above procedures of the boiling and the ultrafiltration were repeated until the n=2 (compound having two sulfonic acid groups) content ratio in the sulfonated pigment became 3%. In the sulfonated pigment obtained finally, the n=1 (compound having one sulfonic acid group) content ratio was 72%, the n=2 (compound having two sulfonic acid groups) content ratio was 3%, and the rest was a non-substitution product. The content of metal ions having a valence of at least 2 was 730 ppm, and total amount of a chloride ion content and a sulfuric acid ion content was 56 ppm. Further, according to the measurement results of emission spectroscopic analysis, the sulfur content was 13,600 ppm (425 $\mu$mol/g) and the sodium content was 9,900 ppm (247 $\mu$mol/g). The neutralization ratio was therefore 58%. The pigment derivative (g) was concentrated to prepare an aqueous dispersion having a concentration of 3% by weight.

(Preparation of a Water-based Pigment Dispersion)

20 g of C.I. pigment red 122 (in which the content of metal ions having a valence of at least 2 was 385 ppm), 80 g of the above aqueous dispersion of the pigment derivative (g) and 60 g of deionized water were mixed, and the mixture was dispersed with a paint shaker in the presence of zirconia beads as media for approximately 7 hours, to obtain a water-based pigment dispersion.

Example 44

Quinacridone Pigment
(Preparation of a Water-based Pigment Dispersion)

20 g of C.I. pigment red 122 (in which the content of metal ions having a valence of at least 2 was 400 ppm), 60 g of the same aqueous dispersion of the pigment derivative (g) as obtained in Example 43 and 60 g of deionized water were mixed, 9 g of 2% by weight triethanolamine was added so as to adjust the neutralization ratio of the pigment derivative to 100%, and the mixture was dispersed with a paint shaker in the presence of zirconia beads as media for approximately 7 hours, to obtain a water-based pigment dispersion.

Example 45

Diketopyrrolopyrrole Pigment
(Preparation of a Pigment Derivative (n))

200 parts of C.I. pigment red 264 was added to 1,500 parts of 22% by weight fuming sulfuric acid at a temperature of 20° C. or lower. Then, the temperature was increased to 75° C., and the mixture was stirred for 5 hours at 75° C., and then the mixture was poured into 3,500 part of ice water, to obtain a precipitate. The precipitate was filtered and washed with common salt water, to obtain 1,500 parts of an aqueous paste of a sulfonated pigment (271 parts when dried). In the sulfonated pigment, the n=1 (compound having one sulfonic acid group) content ratio was 70%, the n=2 (compound having two sulfonic acid groups) content ratio was 16%, and the rest was a non-substitution product.

Then, the aqueous paste of the sulfonated pigment was re-slurried with deionized water to prepare a 2% by weight aqueous dispersion (136 l). The above aqueous dispersion was boiled for 3 hours. The resultant aqueous dispersion was cooled to an ordinary temperature, and then, ultrafiltrated with 136 liters of deionized water. The above procedures of the boiling and the ultrafiltration were repeated until the n=2 (compound having two sulfonic acid groups) content ratio in the sulfonated pigment became 4%. In the sulfonated pigment obtained finally, the n=1 (compound having one sulfonic acid group) content ratio was 82%, the n=2 (compound having two sulfonic acid groups) content ratio was 4%, and the rest was a non-substitution product. The content of metal ions having a valence of at least 2 was 478 ppm, and total amount of a chloride ion content and a sulfuric acid ion content was 70 ppm. Further, according to the measurement results of emission spectroscopic analysis, the sulfur content was 15,300 ppm (478 $\mu$mol/g) and the sodium content was 13,000 ppm (325 $\mu$mol/g). The neutralization ratio was therefore 68%. The pigment derivative (n) was concentrated to prepare an aqueous dispersion having a concentration of 3% by weight.

(Preparation of a Water-based Pigment Dispersion)

20 g of C.I. pigment red 264 (in which the content of metal ions having a valence of at least 2 was 477 ppm), 80 g of the aqueous dispersion the pigment derivative (n) and 60 g of deionized water were mixed, and the mixture was dispersed with a paint shaker in the presence of zirconia beads as media for approximately 7 hours, to obtain a pigment dispersion.

Example 46

Diketopyrrolopyrrole Pigment
(Preparation of a Water-based Pigment Dispersion)

20 g of C.I. pigment red 264 (in which the content of metal ions having a valence of at least 2 was 520 ppm), 60 g of the same aqueous dispersion of the pigment derivative (n) as that obtained in Example 45 and 60 g of deionized water were mixed, 11 g of 2% by weight triethanolamine was added so as to adjust the neutralization ratio of the pigment derivative to 100%, and the mixture was dispersed with a paint shaker in the presence of zirconia beads as media for approximately 7 hours, to obtain a pigment dispersion.

Comparative Example 27

Quinacridone Pigment
(Preparation of a Pigment Derivative (g"))

An aqueous paste of a sulfonated pigment was obtained in the same manner as in Example 43 except that the boiling and the ultrafiltration were not carried out. In the sulfonated pigment, the n=1 (compound having one sulfonic acid group) content ratio was 59%, the n=2 (compound having two sulfonic acid groups) content ratio was 22%, and the rest was a non-substitution product. The content of metal ions having a valence of at least 2 was 760 ppm, and total amount of a chloride ion content and a sulfuric acid ion content was 70 ppm. Further, according to the measurement results of emission spectroscopic analysis, the sulfur content was 24,500 ppm (765 $\mu$mol/g) and the sodium content was 15,900 ppm (398 $\mu$mol/g). The neutralization ratio was therefore 52%. The pigment derivative (g") was concentrated to prepare an aqueous dispersion having a concentration of 3% by weight.

(Preparation of a Water-based Pigment Dispersion)

20 g of C.I. pigment red 122 (in which the content of metal ions having a valence of at least 2 was 444 ppm), 80 g of the aqueous dispersion of the pigment derivative (g") and 60 g of deionized water were mixed, and the mixture was dispersed with a paint shaker in the presence of zirconia beads as media for approximately 7 hours, to obtain a water-based pigment dispersion.

Comparative Example 28

Quinacridone Pigment
(Preparation of a Water-based Pigment Dispersion)

20 g of C.I. pigment red 122 (in which the content of metal ions having a valence of at least 2 was 420 ppm), 60 g of the same aqueous dispersion of the pigment derivative (g") as obtained in Comparative Example 27 and 60 g of deionized water were mixed, 10 g of 2% by weight triethanolamine was added, and the mixture was dispersed with a paint shaker in the presence of zirconia beads as media for approximately 7 hours, to obtain a water-based pigment dispersion.

Comparative Example 29

Diketopyrrolopyrrole Pigment
(Preparation of a Pigment Derivative (n))

An aqueous paste of a sulfonated pigment was obtained in the same manner as in Example 45 except that the boiling and the ultrafiltration were not carried out. In the sulfonated pigment, the n=1 (compound having one sulfonic acid group) content ratio was 70%, the n=2 (compound having two sulfonic acid groups) content ratio was 16%, and the rest was a non-substitution product. The content of metal ions having a valence of at least 2 was 500 ppm, and total amount of a chloride ion content and a sulfuric acid ion content was 78 ppm. Further, according to the measurement results of emission spectroscopic analysis, the sulfur content was 23,600 ppm (737 $\mu$mol/g) and the sodium content was 17,800 ppm (442 μmol/g). The neutralization ratio was therefore 60%. The pigment derivative (n) was concentrated to prepare an aqueous dispersion having a concentration of 3% by weight.

(Preparation of a Water-based Pigment Dispersion)

20 g of C.I. pigment red 264 (in which the content of metal ions having a valence of at least 2 was 480 ppm), 80 g of the aqueous dispersion of the pigment derivative (n) and 60 g of deionized water were mixed, and the mixture was dispersed with a paint shaker in the presence of zirconia beads as media for approximately 7 hours, to obtain a pigment dispersion.

Comparative Example 30

Diketopyrrolopyrrole Pigment
(Preparation of a Water-based Pigment Dispersion)

20 g of C.I. pigment red 264 (in which the content of metal ion having a valence of at least 2 was 505 ppm), 60 g of the same aqueous dispersion of the pigment derivative (n) as obtained in Example 45 and 60 g of deionized water were mixed, 8 g of a 2% by weight triethanolamine was added so as to adjust the nuetralization ratio of the pigment derivative to 100%, and the mixture was dispersed with a paint shaker in the presence of zirconia beads as media for approximately 7 hours, to obtain a pigment dispersion.

The water-based pigment dispersions obtained in the above Examples and Comparative Examples were evaluated, and Table 5 shows the results.

TABLE 5

| | Content of metal ions having a valence of at least 2 (ppm) | Contents of chloride ion and sulfuric acid ion (ppm) | Dispersed average particle diameter (nm) | Dispersed particle diameter, at least 250 nm (%) | Conductivity ($\mu$S/cm) |
|---|---|---|---|---|---|
| Ex. 43 | 400 | 78 | 67 | <1 | 614 |
| Ex. 44 | 370 | 69 | 78 | <1 | 502 |
| Ex. 45 | 391 | 80 | 75 | <1 | 550 |
| Ex. 46 | 428 | 79 | 97 | <1 | 612 |
| CEx. 27 | 509 | 80 | 1,178 | >10 | 851 |
| CEx. 28 | 490 | 99 | 1,384 | >10 | 798 |
| CEx. 29 | 457 | 86 | 579 | >10 | 736 |
| CEx. 30 | 480 | 70 | 635 | >10 | 837 |

| | Surface tension (mN/m) | Viscosity (mPa.S) | Stability in storage (60° C.) | Foamability | Zeta potential (mV) |
|---|---|---|---|---|---|
| Ex. 43 | 65.0 | 3.5 | 21 days or more | ◉ | −56 |
| Ex. 44 | 63.6 | 4.2 | 21 days or more | ◉ | −59 |
| Ex. 45 | 62.4 | 4.1 | 21 days or more | ◉ | −45 |
| Ex. 46 | 63.9 | 3.9 | 21 days or more | ◉ | −42 |
| CEx. 27 | 74.5 | 189 | X | Δ | −17 |
| CEx. 28 | 77.5 | 200 | X | Δ | −25 |
| CEx. 29 | Not measurable | 686 | X | Δ | −35 |
| CEx. 30 | Not measurable | 542 | X | Δ | −23 |

Ex. = Example,
CEx. = Comparative Example

Examples 47 to 50

Comparative Examples 31 to 34

Raw materials having a composition shown in Table 6 were placed in a stirring tank and stirred and mixed with a disper. Then, the mixture was filtered with a 0.8-μm membrane filter to obtain inkjet recording liquids. The inkjet recording liquids were measured for particle diameter and viscosity, and evaluated for stability in storage, ejection stability, water resistance and anti-clogging properties.

Table 6 shows the results.

TABLE 6

| | Ex. 47 | Ex. 48 | Ex. 49 | Ex. 50 |
|---|---|---|---|---|
| Preparation of a water-based pigment dispersion | Ex. 43 | Ex. 44 | Ex. 45 | Ex. 46 |
| Amount of a water-based pigment dispersion (part) | 50 | 50 | 50 | 50 |
| Resin aqueous solution (part) | 1 | 0 | 1 | 3 |
| Glycerol (part) | 10 | 10 | 15 | 15 |
| Ethylene glycol (part) | 5 | 5 | 5 | 0 |
| Diethylene glycol monobutyl ether (part) | 5 | 5 | 0 | 5 |
| Surfactant (part) | 0 | 0 | 0.1 | 0.1 |
| Anti-fungal agent (part) | 0.1 | 0.1 | 0.1 | 0.1 |
| Deionized water (part) | 58.9 | 59.9 | 58.8 | 56.8 |
| Dispersed average particle diameter (nm) | 90 | 110 | 95 | 104 |
| Viscosity (cps) | 3.5 | 4.2 | 3.8 | 3.6 |
| Stability in storage (60° C.) | ○ | ○ | ○ | ○ |
| Ejection stability | ○ | ○ | ○ | ○ |
| Water resistance | ○ | ○ | ○ | ○ |
| Anti-clogging properties | ○ | ○ | ○ | ○ |
| Quality of printed product | ○ | ○ | ○ | ○ |

| | CEx. 31 | CEx. 32 | CEx. 33 | CEx. 34 |
|---|---|---|---|---|
| Preparation of a water-based pigment dispersion | CEx. 27 | CEx. 28 | CEx. 29 | CEx. 30 |
| Amount of a water-based pigment dispersion (part) | 50 | 50 | 50 | 50 |
| Resin aqueous solution (part) | 3 | 0 | 1 | 1 |
| Glycerol (part) | 15 | 15 | 20 | 20 |
| Ethylene glycol (part) | 5 | 5 | 0 | 0 |
| Diethylene glycol monobutyl ether (part) | 0 | 5 | 0 | 0 |
| Surfactant (part) | 0.1 | 0 | 0.1 | 0.1 |
| Anti-fungal agent (part) | 0.1 | 0.1 | 0.1 | 0.1 |
| Deionized water (part) | 56.8 | 54.9 | 58.8 | 58.8 |
| Dispersed average particle diameter (nm) | 250 | 450 | 277 | 503 |
| Viscosity (cps) | 25 | 27 | 24 | 16 |
| Stability in storage (60° C.) | X | X | X | X |
| Ejection stability | X | X | X | X |
| Water resistance | X | X | X | X |
| Anti-clogging properties | X | X | X | X |
| Quality of printed product | X | X | X | X |

Ex. = Example,
CEx. = Comparative Example

What is claimed is:

1. A water-based pigment dispersion comprising 100 parts by weight of a fused polycyclic pigment, 3 to 30 parts by weight of a sulfonic acid group-containing pigment derivative and water, wherein the sulfonic acid group-containing pigment derivative has only one sulfonic acid group in a molecule of a pigment of which the type is the same as the type of the pigment to be dispersed, the sulfonic acid group forms at least one salt selected from the group consisting of ammonia salt, an organic amine salt and a salt in which at least 15% of the sulfonic acid group is liberated and the rest is a salt with monovalent metal, the content of metal ion having a valence of at least 2 in a solid matter of the above water-based pigment dispersion is 500 ppm or less, and the above pigment is dispersed in water according to electrostatic repulsion due to the sulfonic acid group-containing pigment derivative adsorbed on the particle surface of the pigment.

2. A water-based pigment dispersion according to claim 1, wherein the total amount of a chloride ion content and a sulfuric acid ion content in the solid matter in the water-based dispersion is 100 ppm or less.

3. A water-based pigment dispersion according to claim 1, wherein the sulfonic acid group-containing pigment derivative includes a pigment derivative having only one sulfonic acid group in a molecule in an amount of at least 60% by weight and a pigment derivative having at least two sulfonic acid groups in a molecule in an amount of 20% by weight or less based on the pigment to which a sulfonic acid group is to be introduced.

4. A water-based pigment dispersion according to claim 1, wherein the sulfonic acid group-containing pigment derivative is a directly sulfonated pigment.

5. A water-based pigment dispersion according to claim 1, wherein the pigment is a benzimidazolone pigment.

6. A water-based pigment dispersion according to claim 1, wherein the pigment has an average primary particle diameter of 150 nm or less.

7. A water-based pigment dispersion according to claim 1, wherein the pigment has a dispersed particle diameter of 50 nm<D50<150 nm and 150 nm<D99<400 nm.

8. A water-based pigment dispersion according to any one of claims 1 to 5, 6 and 7, wherein the particles of the pigment have a negative zeta potential.

9. A water-based pigment dispersion according to claim 1, wherein the water-based pigment dispersion has a pH of 7 to 10.

10. A water-based pigment dispersion according to claim 1, wherein the water-based pigment dispersion has a conductivity of 600 $\mu$S/cm or less at 25° C.

11. A water-based pigment dispersion according to claim 1, wherein the water-based pigment dispersion has a surface tension of at least 60 mN/m at 25° C.

12. A water-based pigment dispersion according to claim 1, wherein the water-based pigment dispersion has a viscosity of 4.0 mPa·s or less at 25° C.

13. An inkjet recording liquid containing the water-based pigment dispersion comprising 100 parts by weight of a fused polycyclic pigment, 3 to 30 parts by weight of a sulfonic acid group-containing pigment derivative and water, wherein the sulfonic acid group-containing pigment derivative has only one sulfonic acid group in a molecule of a pigment of which the type is the same as the type of the pigment to be dispersed, the sulfonic acid group forms at least one salt selected from the group consisting of ammonia salt, an organic amine salt and a salt in which at least 15% of the sulfonic acid group is liberated and the rest is a salt with monovalent metal, the content of metal ion having a valence of at least 2 in a solid matter of the above water-based pigment dispersion is 500 ppm or less, and the above pigment is dispersed in water according to electrostatic repulsion due to the sulfonic acid group-containing pigment derivative adsorbed on the particle surface of the pigment.

14. A process for the production of a water-based pigment dispersion, comprising a step of introducing at least one sulfonic acid group into a molecule by sulfonating a pigment, a step of obtaining a sulfonic acid group-containing pigment derivative having only one sulfonic acid group by removing a pigment derivative having at least two sulfonic acid groups from a reaction product, and a step of dispersing the sulfonic acid group-containing pigment derivative obtained in the above step and a fused polycyclic pigment having the same type pigment molecule structure as the structure of the above sulfonic acid group-containing pigment derivative in water.

15. A process according to claim 14, wherein the step of removing the pigment derivative having at least two sulfonic acid groups from the reaction product is carried out by an ultrafiltration method.

16. A process according to claim 14, wherein the water-based pigment dispersion is dispersed in water containing monovalent metal ion, ammonia or an organic amine.

17. A process according to claim 14, wherein at least 15% of the sulfonic acid group-containing pigment derivative is present in a liberated state in the water-based pigment dispersion when the sulfonic acid group-containing pigment derivative forms a salt of a monovalent metal ion.

18. A process according to claim 14, wherein the content of metal ion having a valence of at least 2 in a solid content of the water-based pigment dispersion is 500 ppm or less.

19. A process according to claim 14, wherein the pigment has an average primary particle diameter of 150 nm or less.

20. A process according to claim 14, wherein the pigment has a dispersed particle diameter of 50 nm<D50<150 nm and 150 nm<D99<400 nm.

21. A process according to claim 14, wherein the sulfonic acid group-containing pigment derivative includes a pigment derivative having only one sulfonic acid group in a molecule in an amount of at least 60% by weight and a pigment derivative having at least two sulfonic acid groups in a molecule in an amount of 20% by weight or less based on the pigment to which a sulfonic acid group is to be introduced.

* * * * *